（12）United States Patent
Iwasaki

(10) Patent No.: US 10,313,576 B2
(45) Date of Patent: *Jun. 4, 2019

(54) TRANSMISSION APPARATUS, RECEPTION APPARATUS, COMMUNICATION SYSTEM, AND RECORDING MEDIUM

(71) Applicant: CANON KABUSHIKI KAISHA, Tokyo (JP)

(72) Inventor: Takahiro Iwasaki, Kiyose (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/839,448

(22) Filed: Dec. 12, 2017

(65) Prior Publication Data

US 2018/0103191 A1    Apr. 12, 2018

Related U.S. Application Data

(63) Continuation of application No. 15/460,858, filed on Mar. 16, 2017, now Pat. No. 9,973,675, which is a continuation of application No. 15/214,272, filed on Jul. 19, 2016, now Pat. No. 9,736,351, which is a continuation of application No. 14/210,041, filed on Mar. 13, 2014, now Pat. No. 9,423,868.

(30) Foreign Application Priority Data

Mar. 15, 2013    (JP) .................... 2013-053592

(51) Int. Cl.
*G06F 3/00*    (2006.01)
*H04N 5/30*    (2006.01)
*H04N 7/18*    (2006.01)
*H04N 5/232*    (2006.01)

(52) U.S. Cl.
CPC ......... *H04N 5/23206* (2013.01); *G06F 3/005* (2013.01); *H04N 5/23216* (2013.01); *H04N 5/23293* (2013.01); *H04N 5/30* (2013.01); *H04N 7/183* (2013.01)

(58) Field of Classification Search
CPC .......... H04N 5/23206; H04N 5/23293; H04N 7/183; H04N 5/23216; H04N 5/30; G06F 3/005

See application file for complete search history.

(56) References Cited

U.S. PATENT DOCUMENTS

2006/0288390 A1\* 12/2006 Kang ............... H04N 5/76
                                                725/89
2007/0165103 A1\*  7/2007 Arima .............. G06T 3/40
                                                348/14.01

\* cited by examiner

*Primary Examiner* — Timothy J Henn
(74) *Attorney, Agent, or Firm* — Canon U.S.A., Inc. I.P. Division

(57) ABSTRACT

A transmission apparatus configured to transmit image data to a reception apparatus through a network, in which a setting value for generating captured data and a setting value for generating image data by an encoding unit are updated according to reception of a command that sets the setting value for generating the captured data by the image capturing unit. When the setting value for generating the captured data is updated according to the received command, notification is performed through the network regardless of a restart process is performed.

71 Claims, 19 Drawing Sheets

FIG. 2
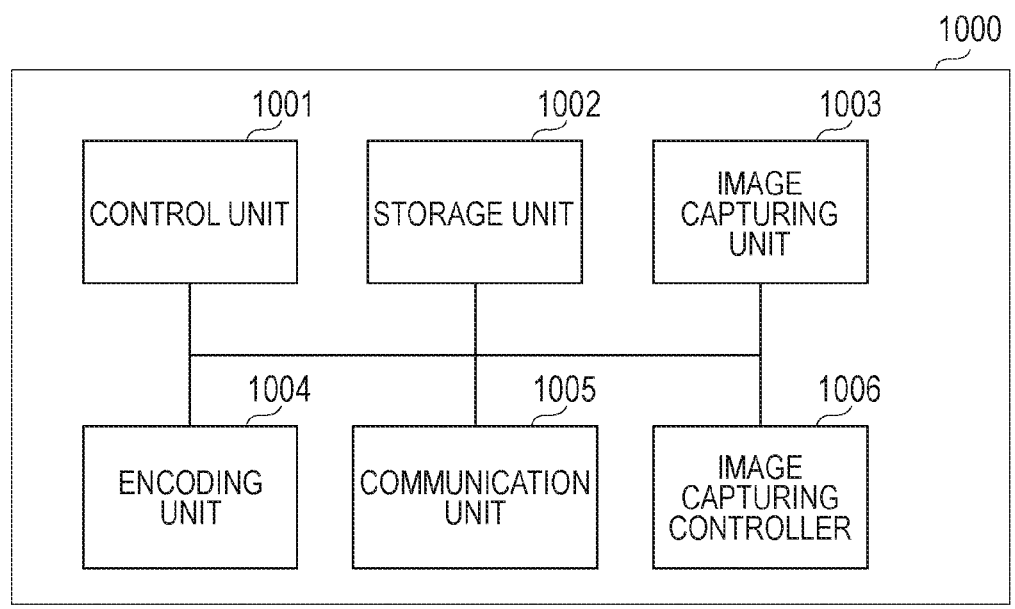
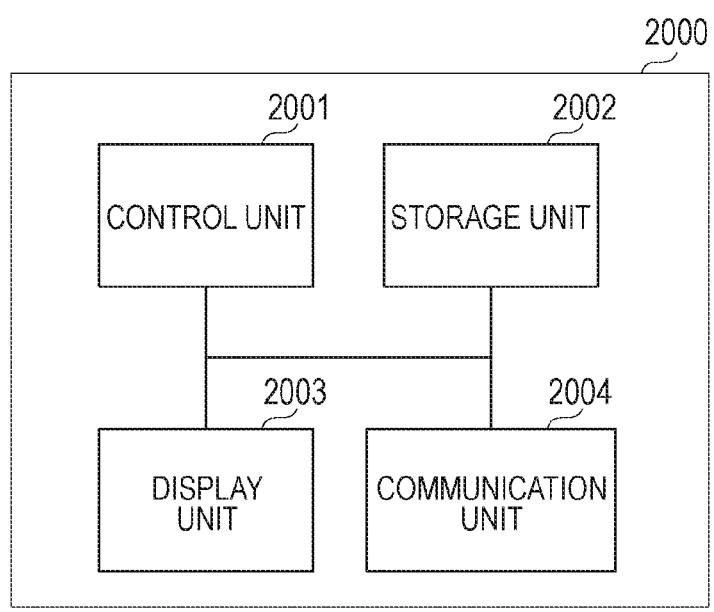

FIG. 4

| ModeNo. | Video Source | | | RebootFlag | OPTION OF Video Encoder Configuration | | SETTABLE RANGE OF FramerateLimit |
|---|---|---|---|---|---|---|---|
| | MaxResolution | MaxFramerate | Encoding | | OPTION OF CODING SYSTEM | OPTION OF Resolution | |
| S1 | 3840×2160 | 20 fps | H.264 | False ⇔CONSISTENT⇔ | H.264 | 3840×2160<br>1920×1080<br>1280×720<br>960×540 | 1~20 fps |
| S2 | 3200×2400 | 30 fps | H.264 | False ⇔CONSISTENT⇔ | H.264 or MPEG4 | 3200×2400<br>2048×1536<br>1024×768<br>640×480 | 1~30 fps |
| S3 | 1024×768 | 30 fps | H.264 or JPEG | True ⇔CONSISTENT⇔ | H.264 or JPEG | 1024×768<br>640×480<br>320×240<br>176×144 | 1~30 fps |
| 4000 | 4001 | 4002 | 4003 | 4004 | 4005 | 4006 | 4007 |

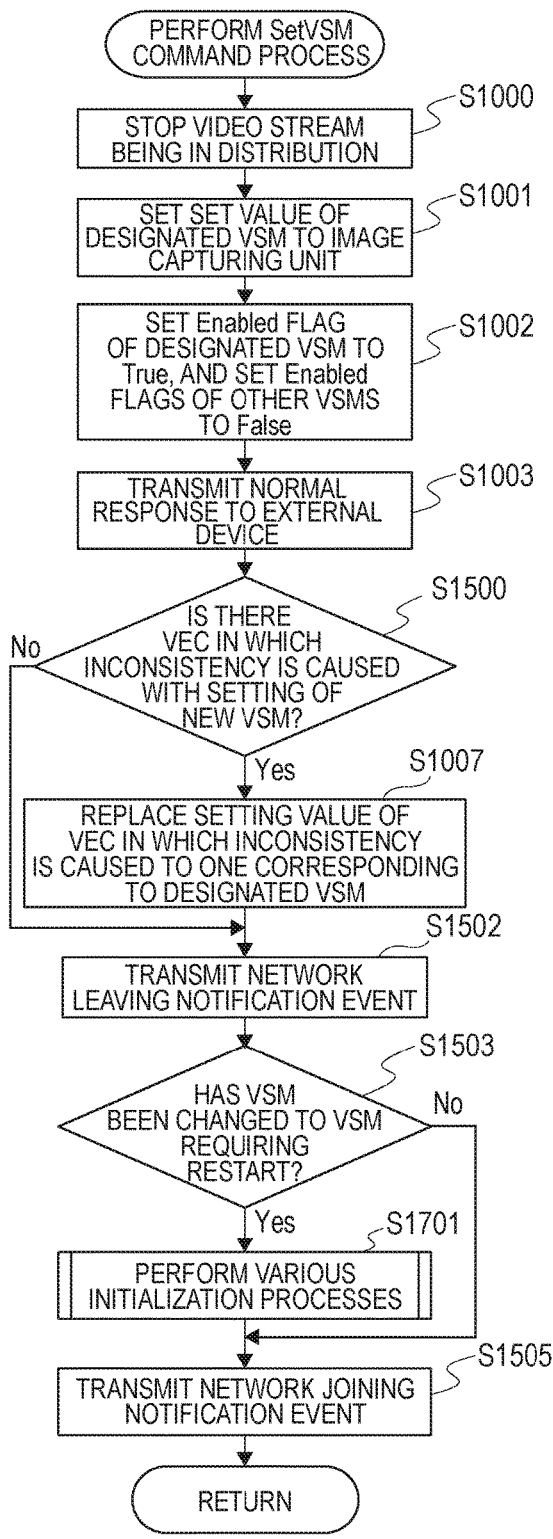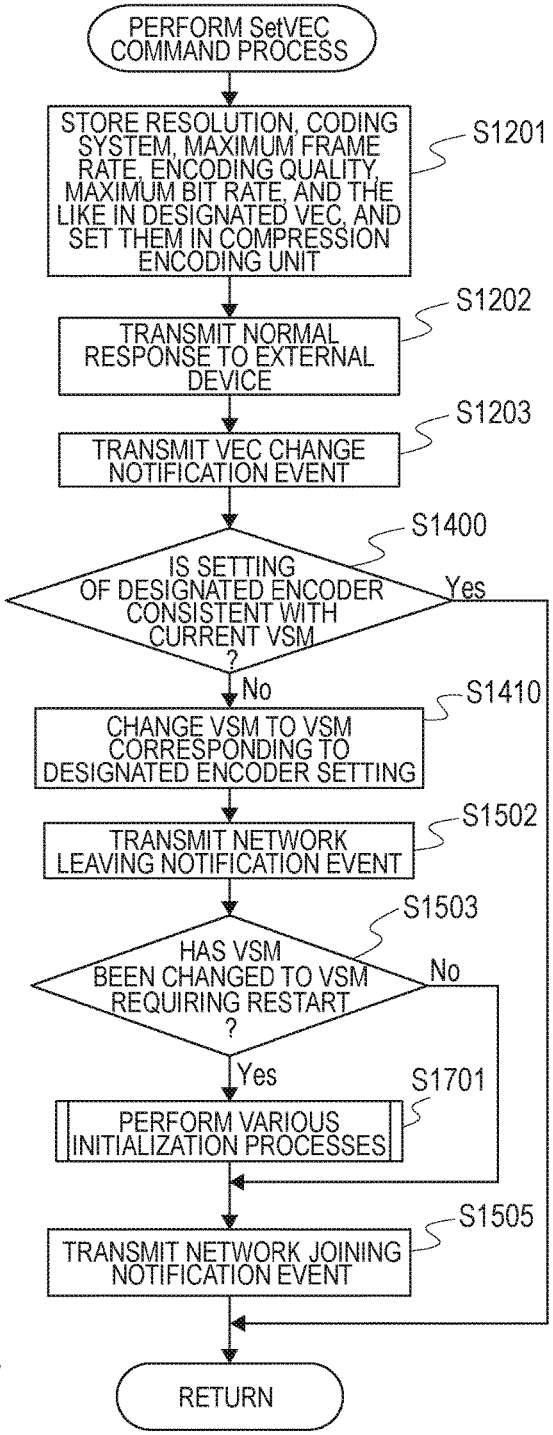

TRANSMISSION APPARATUS, RECEPTION APPARATUS, COMMUNICATION SYSTEM, AND RECORDING MEDIUM

CROSS-REFERENCE TO RELATED APPLICATIONS

This application is a continuation of U.S. patent application Ser. No. 15/460,858, filed on Mar. 16, 2017, which is a continuation of prior U.S. patent application Ser. No. 15/214,272, filed on Jul. 19, 2016, and issued as U.S. Pat. No. 9,736,351 on Aug. 15, 2017, which is a continuation of prior U.S. patent application Ser. No. 14/210,041, filed on Mar. 13, 2014, and issued as U.S. Pat. No. 9,423,868 on Aug. 23, 2016, which claims the benefit of, and priority to, Japanese Patent Application No. 2013-053592, filed Mar. 15, 2013, all of which applications and patents are hereby incorporated by reference herein in their entireties.

BACKGROUND OF THE INVENTION

Field of the Invention

The present invention relates to an image capturing device that distributes a captured image outside, and especially related to a setting change process of an image capturing unit and an encoding unit.

Description of the Related Art

Conventionally, in an image capturing device that transmits a captured image to a reception apparatus, a command group that instructs a setting change from an external device to the image capturing device or start of distribution of an image is incorporated.

For example, a command group defined by the standard established in Open Network Video Interface Forum (ON-VIF) is known, for example.

As a command to the image capturing device, for example, a command that instructs, to the image capturing unit of the image capturing device, generation of image data having predetermined resolution is included.

Further, for example, a command that instructs, to an encoding unit that encodes the image data generated by the image capturing unit, generation of image data having predetermined resolution is included.

Further, Japanese Patent Application Laid-Open No. 2005-323007 discloses an image capturing device including a control unit that controls expansion/compression of a captured image.

However, if one of a set value of the image data generated by the image capturing unit and a set value of the image data generated by the encoding unit is changed, an inconsistency is caused in the combination of the both units, and the image data may not be able to be generated.

For example, assume that the resolution of the image data output from the image capturing unit is 1600×1200 pixels (the proportions=4:3), and the resolution of the image data output from the encoding unit is 1280×1024 pixels (the proportions=4:3).

Here, when a command is received from the external device, and the resolution of the image data output from the image capturing unit is changed to 1920×1080 (Full HD, the proportions=16:9), an inconsistency is caused between the resolution of the image data output from the image capturing unit and the resolution of the image data output from the encoding unit. That is, image data having the proportions of 16:9 is output from the image capturing unit to the encoding unit. Meanwhile, the proportions of the resolution of the image data output from the encoding unit is set to 4:3. Therefore, an inconsistency is caused between the proportions of the image data input to the encoding unit and the proportions of the image data to be output from the encoding unit. In such a case, the encoding unit cannot generate the image data.

Therefore, to eliminate the inconsistency, it can be considered that the image capturing device changes the setting of the proportions of the image data to be output by the encoding unit from 4:3 to 16:9. However, if the image capturing device itself changes the setting, an inconsistency with the set value held by the external device connected to the image capturing device is caused, and the setting change from the external device cannot be normally performed. That is, there is a problem that the set value to the image capturing unit of the monitoring camera and the set value to the encoding unit become inconsistent between the image capturing device and a client.

For example, assume that the proportions of the resolution of the image data output from the image capturing unit of the image capturing device and of the resolution of the image data output from the encoding unit are set to 4:3. At this time, in the external device connected to the image capturing device, the resolution of the image data output from the encoding unit is stored to be 4:3.

Assume that a command to the image capturing unit is transmitted from an external apparatus to the image capturing device, and the resolution of the image data output from the image capturing unit of the image capturing device is changed to 16:9. In response to it, if the image capturing device changes the resolution of the image data output from the encoding unit to 16:9, an inconsistency with the setting of the encoding unit stored in the external device is caused, and the change of the resolution cannot be normally performed.

For example, although it is necessary to instruct the resolution having the proportions of 16:9 to the encoding unit of the image capturing device, in the external apparatus, a user interface for instructing an output of an image data that has the resolution having the proportions of 4:3 to the encoding unit of the image capturing device is presented. Therefore, the change of the resolution cannot be normally performed.

SUMMARY OF THE INVENTION

To solve the above-described problem, a transmission apparatus according to the present invention is, for example, a transmission apparatus configured to transmit image data to a reception apparatus through a network, the transmission apparatus including: an image capturing unit configured to generate captured data; an encoding unit configured to encode the captured data to generate the image data; a reception unit configured to receive, from the reception apparatus, a command that sets a set value for generating the captured data by the image capturing unit; an updating unit configured to update the set value for generating the captured data by the image capturing unit and a set value for generating the image data by the encoding unit according to the command received by the reception unit; a control unit configured to perform a restart process of the transmission apparatus when the set value for generating the captured data is updated to a predetermined set value; and a communication unit configured to perform, through the network, notification indicating the transmission apparatus has been connected to the network, regardless of whether the control unit performs the restart process, when the set value for generating the captured data has been updated according to the command received by the reception unit.

Further, a transmission apparatus according to the present invention is, for example, a transmission apparatus configured to transmit image data to a reception apparatus through a network, the transmission apparatus including: an image capturing unit configured to generate captured data; an encoding unit configured to encode the captured data to generate the image data; a reception unit configured to receive, from the reception apparatus, a command that sets a set value for generating the captured data by the image capturing unit; an updating unit configured to update the set value for generating the captured data by the image capturing unit and a set value for generating the image data by the encoding unit according to the command received by the reception unit; a control unit configured to perform a restart process of the transmission apparatus when the set value for generating the captured data is updated to a predetermined set value; and a communication unit configured to perform, through the network, notification for causing the reception apparatus to acquire the set value for generating the image data, regardless of whether the control unit performs the restart process, when the set value for generating the captured data has been updated according to the command received by the reception unit.

Further, a transmission apparatus according to the present invention is, for example, a transmission apparatus configured to transmit image data to a reception apparatus through a network, the transmission apparatus including: an image capturing unit configured to generate captured data; an encoding unit configured to encode the captured data to generate the image data; a reception unit configured to receive, from the reception unit, a command that sets a set value for generating the image data by the encoding unit; an updating unit configured to update the set value for generating the image data and a set value for generating the captured data according to the command received by the reception unit; a control unit configured to perform a restart process of the transmission apparatus when the set value for generating the captured data by the image capturing unit is updated to a predetermined set value; and a communication unit configured to perform notification through the network, regardless of whether the control unit performs the restart process, when the set value for generating the captured data has been updated according to the command received by the reception unit.

Further, a reception apparatus according to the present invention is, for example, a reception apparatus configured to receive image data through a network from an image capturing device including an image capturing unit and an encoding unit configured to encode captured data generated by the image capturing unit to generate the image data, the reception apparatus including: a transmission unit configured to transmit, to the image capturing device, a command that sets a set value for generating the captured data by the image capturing unit; and a reception unit configured to receive, through the network, notification indicating the image capturing device has been connected to the network, regardless of whether the image capturing device performs a restart process, when the set value for generating the captured data by the image capturing unit has been set to the image capturing device according to the command transmitted by the transmission unit.

Further, a reception apparatus according to the present invention is, for example, a reception apparatus configured to receive image data through a network from an image capturing device including an image capturing unit and an encoding unit configured to encode captured data generated by the image capturing unit to generate the image data, the reception apparatus including: a transmission unit configured to transmit, to the image capturing device, a command that sets a set value for generating the captured data by the image capturing unit; and a reception unit configured to receive, through the network, notification for causing the reception unit to acquire a set value for generating the image data, regardless of whether the image capturing unit performs a restart process, when the set value for generating the captured data by the image capturing unit has been set to the image capturing device according to the command transmitted by the transmission unit.

Further, a reception apparatus according to the present invention is, for example, a reception apparatus configured to receive image data through a network from an image capturing device including an image capturing unit and an encoding unit configured to encode captured data generated by the image capturing unit to generate the image data, the reception apparatus including: a transmission unit configured to transmit, to the image capturing device, a command that sets a set value for generating the image data by the encoding unit; and a reception unit configured to receive, when a set value for generating the captured data has been updated in the image capturing device according to the command transmitted by the transmission unit, notification according to the update through the network, regardless of whether the image capturing device performs a restart process.

Further, a reception apparatus according to the present invention is, for example, a reception apparatus configured to receive image data through a network from an image capturing device including an image capturing unit and an encoding unit configured to encode captured data generated by the image capturing unit to generate the image data, the reception apparatus including: a display control unit configured to display, in a display unit, a setting screen including a first setting area configured to display a graphical user interface for setting a set value for generating the captured data by the image capturing unit, and a second setting area configured to display a graphical user interface for setting a set value for generating the image data by the encoding unit; a transmission unit configured to transmit, when the setting value for generating the captured data has been changed through the graphical user interface displayed in the first setting area, a command that sets a set value for generating the changed captured data, to the image capturing device; and a reception unit configured to receive notification indicating the image capturing device has been connected to the network according to the transmission of the command, in which the transmission unit transmits, to the image capturing device, an acquisition request of the set value for generating the image data when the notification is received, and the display control unit displays the set value for generating the image data acquired by the acquisition request in the graphical user interface displayed in the second setting area.

Further, a reception apparatus according to the present invention is, for example, a reception apparatus configured to receive image data through a network from an image capturing device including an image capturing unit and an encoding unit configured to encode captured data generated by the image capturing unit to generate the image data, the reception apparatus including:

a display control unit configured to display, in a display unit, a setting screen including a first setting area configured to display a graphical user interface for setting a set value for generating the captured data by the image capturing unit, and a second setting area configured to display a graphical user interface for setting a set value for generating the image data by the encoding unit;

a transmission unit configured to transmit, when the setting value for generating the captured data has been changed through the graphical user interface displayed in the first setting area, a command that sets a set value for generating the changed captured data, to the image capturing device; and a reception unit configured to receive, according to the transmission of the command, notification transmitted by the image capturing device according to the command so as to cause the reception apparatus to acquire the set value for generating the image data, in which the transmission unit transmits, to the image capturing device, an acquisition request of the set value for generating the image data when the notification is received, and the display control unit displays the set value for generating the image data acquired by the acquisition request in the graphical user interface displayed in the second setting area.

Further, a reception apparatus according to the present invention is, for example, a reception apparatus configured to receive image data through a network from an image capturing device including an image capturing unit and an encoding unit configured to encode captured data generated by the image capturing unit to generate the image data, the reception apparatus including: a display control unit configured to display, in a display unit, a setting screen including a first setting area configured to display a graphical user interface for setting a set value for generating the captured data by the image capturing unit, and a second setting area configured to display a graphical user interface for setting a set value for generating the image data by the encoding unit; a transmission unit configured to transmit, when the setting value for generating the image data has been changed through the graphical user interface displayed in the second setting area, a command that sets a set value for generating the changed image data, to the image capturing device; and a reception unit configured to receive, according to the transmission of the command, notification according to setting for generating the captured data having been changed by the image capturing device, in which the transmission unit transmits, to the image capturing device, an acquisition request of the set value for generating the captured data when the notification is received, and the display control unit displays the set value for generating the captured data acquired by the acquisition request in the user interface displayed in the first setting area.

Further features of the present invention will become apparent from the following description of exemplary embodiments (with reference to the attached drawings).

BRIEF DESCRIPTION OF THE DRAWINGS

FIG. 2 is a diagram illustrating a configuration of a transmission apparatus and a reception apparatus according to a first embodiment;

FIG. 4 is a diagram illustrating an example of a corresponding relationship between setting to an image capturing unit of the transmission apparatus and setting to an encoding unit of the transmission apparatus;

FIG. 11A is a flowchart illustrating a SetVSM command process of the transmission apparatus in the third embodiment;

FIG. 11B is a flowchart illustrating a SetVEC command process of the transmission apparatus in the third embodiment.

DESCRIPTION OF THE EMBODIMENTS

Hereinafter, favorable embodiments of the present invention will be described in detail with reference to the appended drawings.

First Embodiment

Figure 1A:
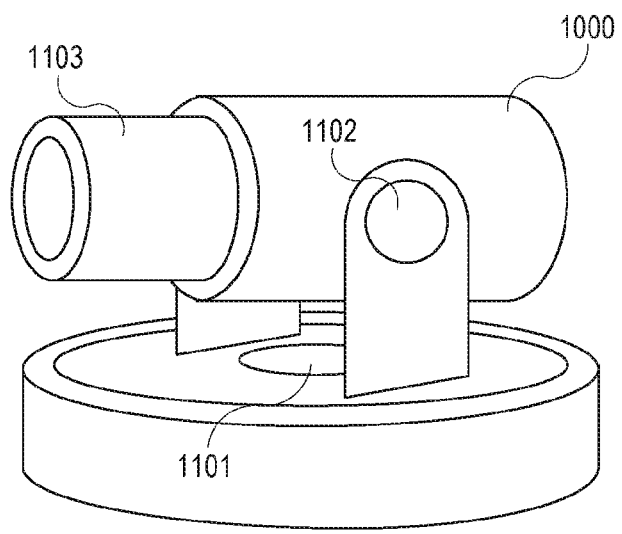
FIG. 1A is a diagram illustrating an example of an image capturing device according to the present invention.

FIG. 1A is a diagram illustrating a monitoring camera 1000 (transmission apparatus) in the present embodiment. A pan mechanism 1101 is a mechanism that changes a direction of an image capturing system of the monitoring camera 1000 to a pan direction. Further, a tilt mechanism 1102 is a mechanism that changes the direction of the image capturing system of the monitoring camera 1000 to a tilt direction. Further, a zoom mechanism 1103 is a mechanism that changes a zoom magnification of the image capturing system of the monitoring camera 1000. In the present invention, the pan mechanism 1101, the tilt mechanism 1102, and the zoom mechanism 1103 are not indispensable configurations.

Figure 1B:
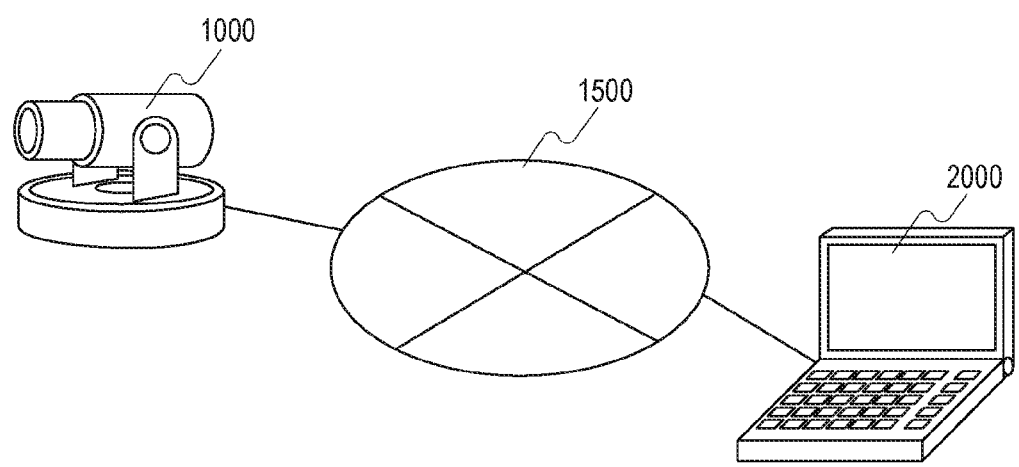
FIG. 1B is a diagram illustrating a configuration of a transmission/reception system according to an embodiment.

FIG. 1B is a configuration diagram of a communication system including the monitoring camera 1000. The monitoring camera 1000 and a client 2000 (reception apparatus) are connected in a state of being capable of mutual communication through an IP network 1500. The client 2000 transmits various commands such as change of an imaging parameter described below, pan head drive, and start of video streaming to the monitoring camera 1000. The monitoring camera 1000 transmits a response or video streaming in response to the commands to the client 2000.

FIG. 2 is a diagram illustrating a configuration of the monitoring camera 100.

The control unit 1001 controls configurations of the monitoring camera 1000 illustrated in FIG. 2. The control unit 1001 is, for example, a central processing unit (CPU) and the like.

The control unit 1001 performs, as described below, a restart process of the monitoring camera 1000 when causing captured data generated by the image capturing unit 1003 to be a predetermined set value (for example, predetermined resolution, a predetermined frame rate, or a predetermined coding format).

Further, the control unit 1001 performs, as described below, control of updating at least one of set values of resolution, a frame rate, and a coding format of image data generated by the encoding unit 1004 according to a command from the client 2000.

Further, the control unit 1001 performs, as described below, control of updating at least one of set values of resolution, a frame rate, and a coding format of image data generated by the image capturing unit 1003 according to a command from the client 2000.

The storage unit 1002 is mainly used as storage areas of various data such as a storage area of programs executed by the control unit 1001, a work area during execution of a program, and a storage area of image data generated by the image capturing unit 1003 described below.

The image capturing unit 1003 generates captured data. The image capturing unit 1003 converts an analog signal acquired by photographing an object into digital data, and outputs the digital data to the storage unit 1002 as a captured image. The image capturing unit 1003 supports a plurality of resolution of image data to be output, frame rates, and setting modes (VideoSourceMode) of a coding system that can be used. The VideoSourceMode can be switched by a SetVideoSourceMode command described below.

The encoding unit 1004 encodes the captured data generated by the image capturing unit 1003 to generate image data. The encoding unit 1004 performs an encoding process with respect to the captured image output from the image capturing unit 1003 based on a format such as JPEG or H.264. The image data subjected to the encoding process is output to the storage unit 1002. The types of the resolutions of the image data output from the encoding unit 1004 has a corresponding relationship with the modes of the image capturing unit 1003 as illustrated in FIG. 4 described below.

The communication unit 1005 receives control commands from the external device. Further, the communication unit 1005 transmits, to the external device, responses to the control commands.

The communication unit 1005 receives, as described below, a command that sets a set value of at least one of the resolution, the frame rate, and the coding format of the captured data generated by the image capturing unit 1003 from the client 2000. As the set value, a plurality of sizes of the resolution, a range of the frame rate, or a plurality of types of the coding formats, which is used by the image capturing unit 1003 to generate the captured data, can be included.

Further, the communication unit 1005 receives, from the client 2000, a command that sets a set value of at least one of the resolution, the frame rate, and the coding format of the image data generated by the encoding unit 1004. As the set value, a plurality of sizes of the resolution, a range of the frame rate, or a plurality of types of the coding formats, which is used by the encoding unit 1004 to generate the image data, can be set.

Further, the communication unit 1005 transmits, to the client 2000, update notification indicating that the monitoring camera has automatically updated setting of at least one of the resolution, the frame rate, or the coding format of the image data generated by the encoding unit 1004.

Further, the communication unit 1005 transmits, to the client 2000, update notification indicating that the monitoring camera 1000 has automatically updated setting of at least one of the resolution, the frame rate, or the coding format of the captured data generated by the image capturing unit 1003.

The image capturing controller 1006 controls the tilt mechanism 1102, the pan mechanism 1101, and the zoom mechanism 1103 according to values of a pan angle, a tilt angle, a zoom magnification input by the control unit 1001. Further, the image capturing controller 1006 provides a current pan angle value, tilt angle value, and zoom magnification value in response to an inquiry from the control unit 1001.

As described above, while the configuration of the monitoring camera 1000 has been described with reference to FIG. 2, the processing blocks illustrated in FIG. 2 describe an example of a favorable embodiment of a security camera in the present invention, and the embodiment is not limited to the example. Various modifications and changes are possible within the scope of the gist of the present invention, such as providing an audio input unit and removing the image capturing controller.

Next, names and content of the commands, parameters, and the like used in the present embodiment will be described.

Figure 3:
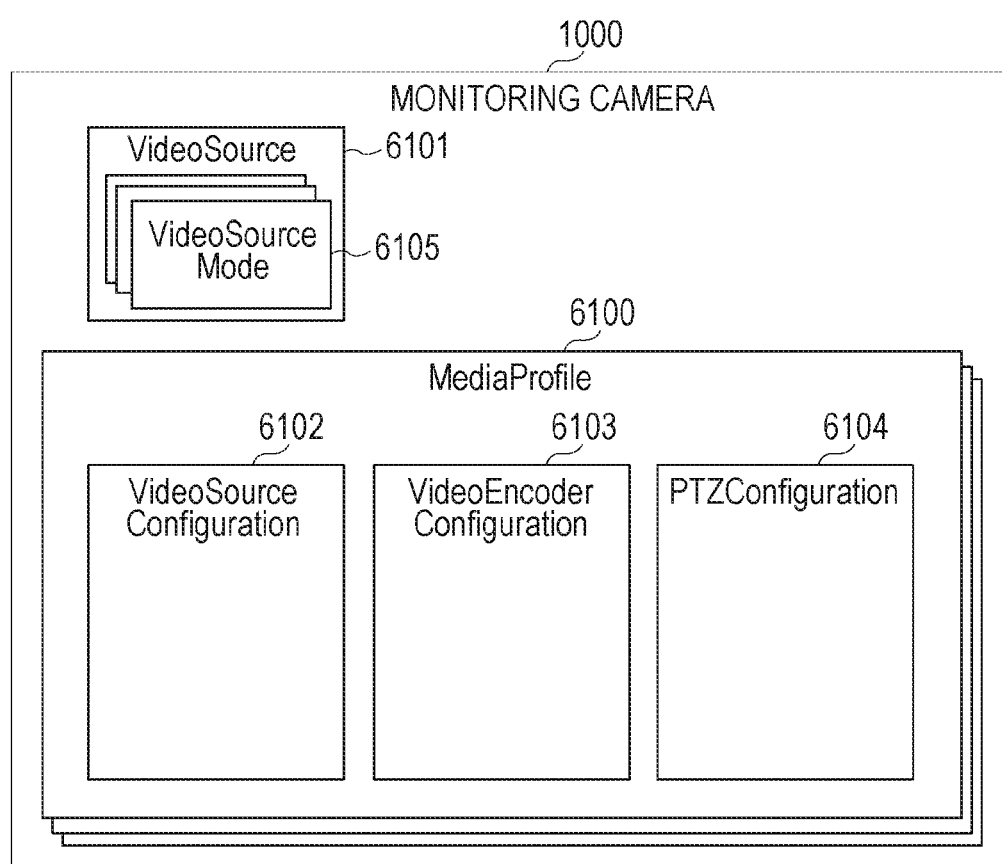
FIG. 3 is a diagram illustrating an example of a parameter held by the transmission apparatus.

FIG. 3 illustrates a structure of a parameter held by the monitoring camera 1000 in the present embodiment.

MediaProfile 6100 is a parameter set for storing various types of setting items of the monitoring camera in association with each other. The MediaProfile 6100 includes ProfileToken that is an ID of the MediaProfile 6100. Further, the MediaProfile 6100 includes VideoSourceConfiguration (hereinafter, VSC) 6102, VideoEncoderConfiguration (hereinafter, VEC) 6103, and PTZConfiguration 6104. Further, the MediaProfile 6100 holds a link to the various types of setting items including an encoder of audio, and the like.

The VideoSource 6101 is an aggregation of parameters that indicate the performance of a single image capturing unit 1003 included in the monitoring camera. The VideoSource 6101 includes the VideoSourceToken that is an ID of the VideoSource 6101, and Resolution that indicates resolution of image data that can be output by the image capturing unit 1003.

The VideoSource 6101 supports maximum resolution of the image data that can be output, the frame rate, and a plurality of VideoSourceModes (hereinafter, VSMs) including coding systems that can be used. The VSM can be switched by the SetVideoSourceMode command. Details of the VSM will be described below.

The VSC 6102 is an aggregation of parameters that associate the VideoSource 6101 provided in the monitoring camera with the MediaProfile 6100. The VSC 6102 includes Bounds that designates which part is segmented from the image data output from the VideoSource 6101 and is to be a distributed image.

The VEC 6103 is an aggregation of parameters that associate encoder setting related to encoding of image data with the MediaProfile 6100.

The image capturing unit 1003 of the monitoring camera 1000 outputs image data based on the content of the VideoSource 6101 and the VSC 6102. The encoding unit 1004 encodes the image data output from the image capturing unit 1003 according to a coding system set in the VEC 6103 (for example, JPEG or H.264), the frame rate, and the parameters such as the resolution. The communication unit 1005 distributes the image data encoded by the encoding unit 1004 to the client 2000 as a distribution image.

The VEC 6103 includes VideoEncoderConfigurationToken that is an ID for identifying the VEC 6103. Further, the VEC 6103 includes Encoding that designate the coding system, and Resolution that designate the resolution of an output image. Further, the VEC 6103 includes Quality that designates the encoding quality, FramerateLimit that designates a maximum frame rate of the output image, and BitrateLimit that designates a maximum bit rate.

The PTZConfiguration 6104 is an aggregation of parameters that associates setting related to the pan mechanism 1101, the tilt mechanism 1102, and the zoom mechanism 1103 of the monitoring camera 1000 with the MediaProfile 6100. The PTZConfiguration 6104 includes information related to a coordinate system that represents actual pan/tilt angle values and zoom magnification value in the pan mechanism, the tilt mechanism, and the zoom mechanism.

The table of FIG. 4 illustrates the VSMs supported by the monitoring camera 1000 and the setting content of the VECs corresponding to the respective VSMs. The VEC corresponding to each VSM is consistent with the VSM. The table of FIG. 4 is stored in the storage unit 1002 in the monitoring camera 100 in advance, and is referred by the control unit 1001 as needed.

ModeNo.4000 indicates a mode number of the VSM used by the monitoring camera 1000 in an internal process. In the present example, the monitoring camera 1000 supports three VSMs of S1, S2, and S3.

MaxResolution 4001 is a parameter indicating maximum resolution output by the image capturing unit 1003 in each VSM.

MaxFramerate 4002 is a parameter indicating a maximum frame rate that can be output by the image capturing unit 1003 in each VSM.

Encoding 4003 is a parameter indicating a coding system of the VEC that can be used in each VSM.

RebootFlag 4004 is a parameter indicating whether the image capturing unit 1003 requires restart when switching to each VSM is performed. A restart process of the monitoring camera 1000 is caused when switching to the VSM in which the RebootFlag 4004 is True is caused by the SetVideoSourceMode command.

The VSM includes an Enabled flag in addition to these parameters. Currently, True is set to an Enabled flag of an effective VSM set to the image capturing unit 1003, and False is set to other Enabled flags.

The parameters 4005 to 4007 indicate a settable range and options of each parameter of the VEC 6103 that can be set to the VEC 6103 by the SetVideoEncoderConfiguration command from an external device in each VSM.

An option 4005 indicates options of the coding system. For example, when the VSM is S1, the option 4005 indicates only H.264 is selectable as the coding system.

As described above, the resolution for generating image data is set so that the coding system can be included in the options of the coding system set for generating captured data.

An option 4006 indicates options of the resolution (Resolution) of the VEC. In the example of FIG. 4, when the VSM is S2, the option indicates resolutions of 3200×2400, 2048×1536, 1024×768, and 640×480 are selectable.

As described above, the resolution for generating image data is set so that the resolution can be included in the options of the resolution set for generating captured data.

An option 4007 indicates a settable range of FramerateLimit of the VEC. For example, when the VSM is S3, the option indicates the FramerateLimit in a range from 1 to 30 fps can be designated.

As described above, the frame rate for generating image data is set so that the frame rate becomes the frame rate set for generating captured data or less.

The options 4005, 4006, and 4007 are notified to the client 2000 as a response to a GetVECOptions command. Here, a GetVideoEncoderConfigurationOptions command is a command from the client 2000 to the monitoring camera 1000 for requesting notification of the options of the set values that can be set to the encoding unit 1004 of the monitoring camera 1000. Hereinafter, the GetVideoEncoderConfigurationOptions command is represented as GetVECOptions command.

Figure 5A:
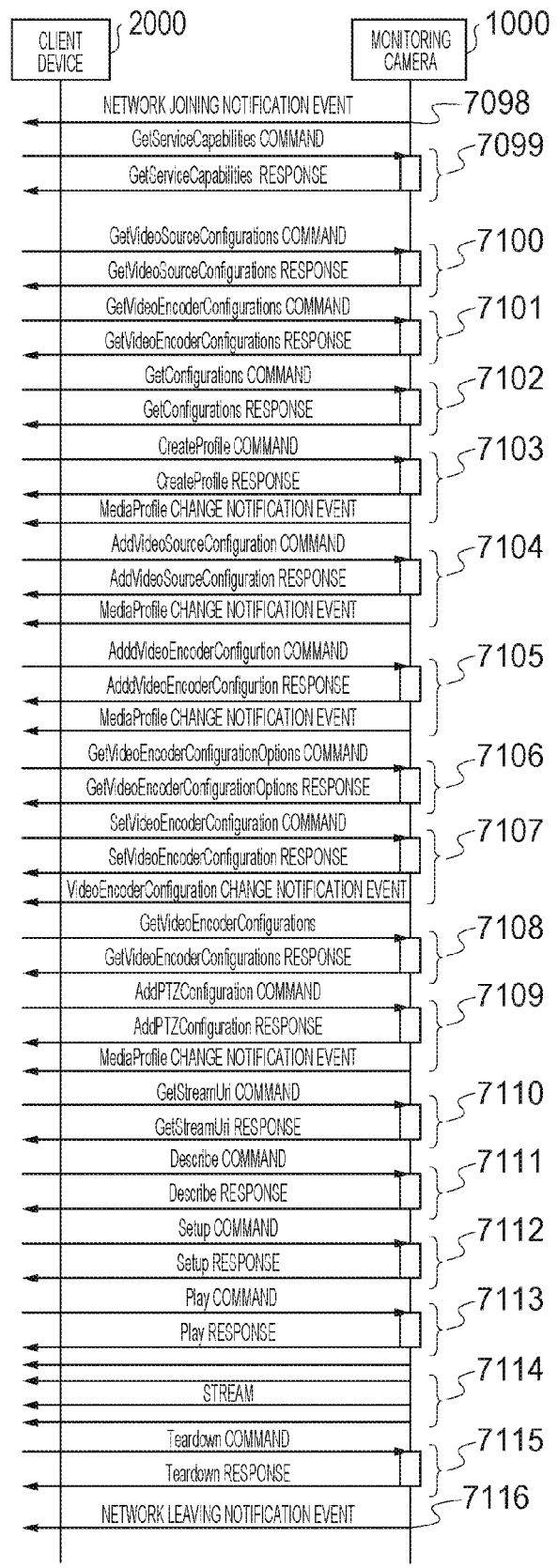
FIG. 5A is a diagram illustrating a command sequence from start of setting to distribution of a video image between the transmission apparatus and a reception apparatus in the first embodiment.

FIG. 5A illustrates an example of a command sequence from start of setting to distribution of a video image between the monitoring camera 1000 and the client 2000. A pair of a command transmitted from the client 2000 to the monitoring camera 1000 and a response returned from the monitoring camera 1000 to the client 2000 is referred to as transaction.

An event 7098 is a network joining notification (reconnection notification) event. The monitoring camera 1000 transmits the event to the network by multicast, and indicates, to a connected external device, the monitoring camera 1000 has become to be able to receive a command.

A transaction 7099 is a transaction of a GetServiceCapabilities command. The GetServiceCapabilities command is a command that instructs returning of function information that indicates functions supported by the monitoring camera 1000. The function information includes information that indicates whether the monitoring camera 1000 handles switching of the VSM.

A transaction 7100 is a transaction of a GetVideoSourceConfigurations command. The client 2000 acquires a list of the VSC 6102 held in the monitoring camera 1000 by transmitting the command to the monitoring camera 1000 (transmission procedure).

A transaction 7101 is a transaction of a GetVideoEncoderConfigurations command. The client 2000 acquires a list of the VEC 6103 held in the monitoring camera 1000 by transmitting the command to the monitoring camera 1000 (transmission procedure).

A transaction 7102 is a transaction of a GetConfigurations command. The client 2000 acquires a list of the PTZConfiguration 6104 held in the monitoring camera 1000 with the command.

A transaction 7103 is a transaction of a CreateProfile command. The client 2000 creates new MediaProfile 6100 in the monitoring camera 1000 with the CreateProfile command, and obtains ProfileToken thereof. After the command process, the monitoring camera 1000 transmits a change notification event of MediaProfile in order to notify the client on the network of the change of MediaProfile.

A transaction 7104 is a transaction of an AddVideoSourceConfiguration command.

A transaction 7105 is a transaction of an AdddVideoEncoderConfigurtion command.

A transaction 7109 is a transaction of an AddPTZConfiguration command.

The client 2000 designates an ID of MediaProfile in the commands of the transactions 7104, 7105, and 7109. As described above, the client 2000 can associate desired VSC, VEC, and PTZConfiguration with the designated MediaProfile.

After these command processes, the monitoring camera 1000 transmits a change notification event of MediaProfile in order to notify the client on the network of a fact that some sort of change is caused in MediaProfile.

A transaction 7106 is a transaction of a GetVECOptions command. The client 2000 acquires, with these commands, the options of the parameters and the range of the set values that can be received by the monitoring camera 1000 in the VEC designated with the ID.

A transaction 7107 is a transaction of a SetVideoEncoderConfiguration command. The client 2000 sets the parameters of the VEC 6103 with the command. After the command process, the monitoring camera 1000 transmits a change notification event of the VEC in order to notify the client on the network of a fact that the VEC has had a change.

A transaction 7110 is a transaction of a GetStreamUri command. The client 2000 acquires, with the command, an address (for example, a uniform resource identifier (URI)) used by the monitoring camera 1000 to acquire a distribution stream, based on the setting of the designated MediaProfile.

A transaction 7111 is a transaction of a Describe command. The client 2000 requests and acquires information of content streamed by the monitoring camera 1000 by executing the command using the URI acquired in the transaction 7110.

A transaction 7112 is a transaction of a Setup command. A method of transmitting a stream including a session number is shared between the client 2000 and the monitoring camera 1000 by execution of the command using the URI acquired in the transaction 7110.

A transaction 7113 is a transaction of a Play command. The client 2000 requests start of streaming to the monitoring camera 1000 by executing the command using the session number acquired in the transaction 7112.

A transaction 7114 is a distribution stream. The monitoring camera 1000 distributes the stream, start of which has been requested in the transaction 7113 by the transmission method shared in the transaction 7112.

A transaction 7115 is a transaction of a Teardown command. The client 2000 requests stop of the stream to the monitoring camera 1000 by executing the command using the session number acquired in the transaction 7112.

A transaction 7116 is a network leaving notification event (leaving notification). The monitoring camera 1000 transmits the event to the network by multicast, and indicates, to a connected external device, that the monitoring camera 1000 has become not to be able to receive a command.

Figure 5B:
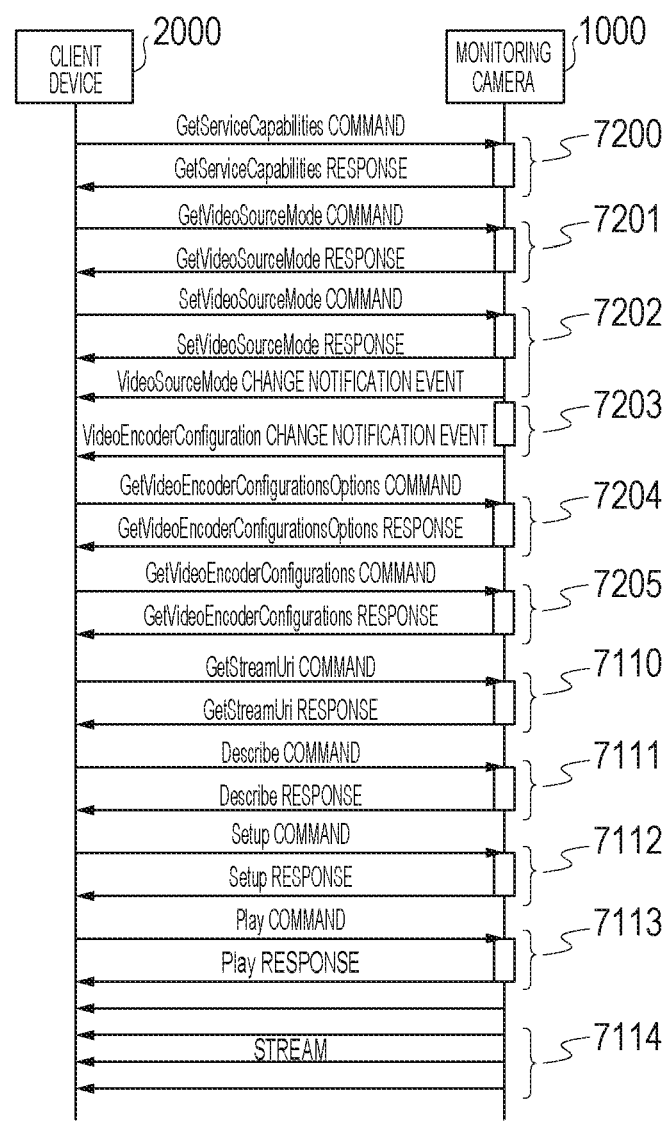
FIG. 5B is a diagram illustrating a command sequence of when a mode change of VSM without restart is performed between the transmission apparatus and the reception apparatus in the first embodiment.

FIG. 5B illustrates a command sequence of when a mode change of the VSM without restart is performed between the monitoring camera 1000 and the client 2000. In the present embodiment, a mode change of the VSM is performed without restart with reference to the table illustrated in FIG. 4 when the RebootFlag 4004 of the mode of the VSM to be selected is False. That is, when the restart information associated with the mode of the VSM to be selected indicates restart is not required when the mode is changed to the VSM, the mode change of the VSM is performed with the following command sequence.

A transaction 7200 is a transaction of a GetServiceCapabilities command. The GetServiceCapabilities command is a command that instructs returning of the function information that indicates functions supported by the monitoring camera 1000. The function information includes information indicating whether the monitoring camera 1000 handles the switching of the VSM.

A transaction 7201 is a transaction of a GetVideoSourceMode command. The GetVideoSourceMode command is a command that instructs returning of the list of the VSM supported by the VideoSource 6101 having the ID designated by the client 2000. When having determined that the monitoring camera 1000 handles the switching of the VSM with the GetServiceCapabilities command 7200, the client 2000 acquires the VSM supported by the monitoring camera 1000 with the command. When having received the GetVideoSourceMode command, the control unit 1001 of the monitoring camera 1000 acquires the parameters of VSMs of S1 to S3 stored in the storage unit 1002 illustrated in FIG. 4, and returns the parameters to the client 2000 through the communication unit 1005.

A transaction 7202 is a transaction of a SetVideoSourceMode command. The SetVideoSourceMode command is a command that instructs changing of the VSM of the VideoSource 6101 designated by the client 2000 (for example, from S1 to S3 of FIG. 4). After the switching of the VSM, the control unit 1001 of the monitoring camera 1000 transmits a VSM change notification event in order to notify the client on the network of the change of the VSM.

A transaction 7203 indicates a process of updating inconsistency of the VEC caused between the VEC and the VideoSourceMode due to the switching of the SetVideoSourceMode illustrated in transaction 7202. When the update is performed, the control unit 1001 of the monitoring camera 1000 transmits a VEC change notification event, and notifies the client on the network of the set value of the VEC and reacquisition of the options of the set value of the VEC.

As described above, the monitoring camera 1000 according to the present embodiment notifies the client 2000 of, when having automatically updated the VEC with the change of the VSM, the fact of the update even if the restart process is not required when changing the setting of the image capturing unit 1003 to a predetermined VSM.

That is, when having set the set value for generating the captured data, the monitoring camera 1000 performs, through the network, notification for causing the client 2000 to acquire the set value (for example, the VEC) for generating image data regardless of whether performing the restart process.

A transaction 7204 is a transaction of a GetVECOptions command. Further, a transaction 7205 is a transaction of a GetVideoEncoderConfigurations command. The client 2000 that has received a VEC change notification event illustrated in transaction 7203 acquires the updated set value of the VEC and the options of the set value of the VEC with these commands.

As described above, the monitoring camera 1000 receives an acquisition request of the updated set value (VEC) from the client 2000 that has received the VSM change notification.

Figure 5C:
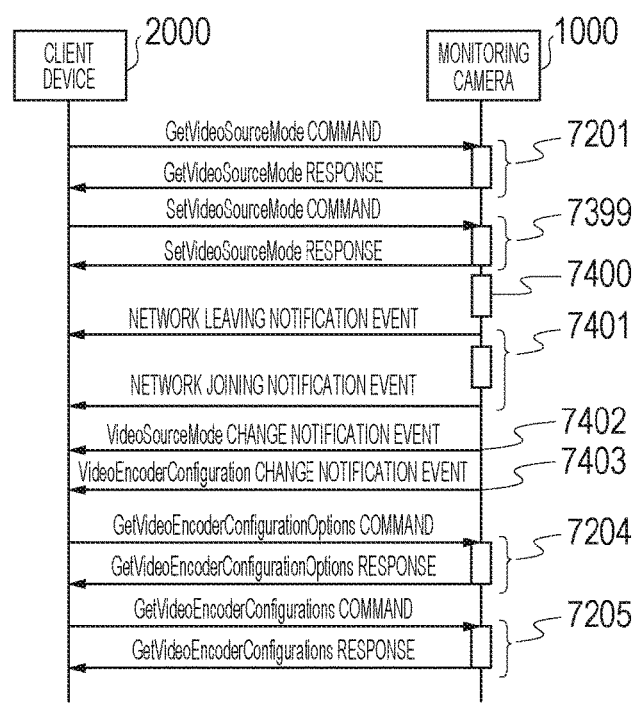
FIG. 5C is a diagram illustrating a command sequence of when a mode change of VSM with restart is performed between the transmission apparatus and the reception apparatus in the first embodiment.

FIG. 5C illustrates a command sequence of when a mode change of the VSM with restart is performed between the monitoring camera 1000 and the client 2000.

In FIG. 5C, the transaction 7201 and preceding transactions and the transaction 7204 and subsequent transactions are similar to those of FIG. 5B.

In the present embodiment, a mode change of the VSM is performed with restart with reference to the table illustrated in FIG. 4 when the RebootFlag 4004 of the selected mode of the VSM is True. That is, when the restart information associated with the selected mode of the VSM indicates restart is required when the mode is changed to the VSM, the mode change of the VSM is performed according to the following command sequence.

A transaction 7399 is a transaction of a SetVideoSourceMode command that changes the mode to the VSM that requires restart. In the example of the command sequence illustrated in FIG. 5C, the monitoring camera 1000 does not transmit the VSM change notification event in the transaction 7399.

A process 7400 indicates a process of updating the inconsistency caused between the VSM and the VEC due to the switching of the SetVideoSourceMode illustrated in transaction 7399. In this case, the monitoring camera 1000 does not transmit the VEC change notification event at this timing.

An event 7401 is a restart process of the monitoring camera 1000. The monitoring camera 1000 first transmits a network leaving notification event to the network. Next, the monitoring camera 1000 performs a restart process. After the restart, the monitoring camera 100 transmits a network joining notification event to the network.

An event 7402 is a VSM change notification event. Further, an event 7403 is a VEC change notification event. The monitoring camera 1000 transmits these events after the restart and prompts the client 2000 to reacquire the set value.

As described above, when a restart process is required when the monitoring camera 1000 has changed the setting of the image capturing unit 1003 to a predetermined VSM, the monitoring camera 1000 according to the present embodiment notifies the client 2000 of, when having automatically updated the VEC with the change of the VSM, the fact of the change.

That is, when having set the set value for generating the captured data, the monitoring camera 1000 performs notification for causing the client 2000 to acquire the set value for generating image data regardless of whether performing the restart process. The notification for causing the client 2000 to acquire the set value for generating image data is, for example, the VEC change notification.

Next, processes performed by the monitoring camera 1000 of the present embodiment will be described with reference to FIGS. 6A to 6D. In an embodiment in which a processor is built in the control unit 1001 of the monitoring camera 1000, the process flows from FIG. 6A to FIG. 6D indicate a program for causing the control unit 1001 to execute the procedures illustrated in FIGS. 6A to 6D. The processor built on the control unit 1001 is a computer, and executes a program read out from the storage unit 1002 built in the monitoring camera 1000.

Figure 6A:
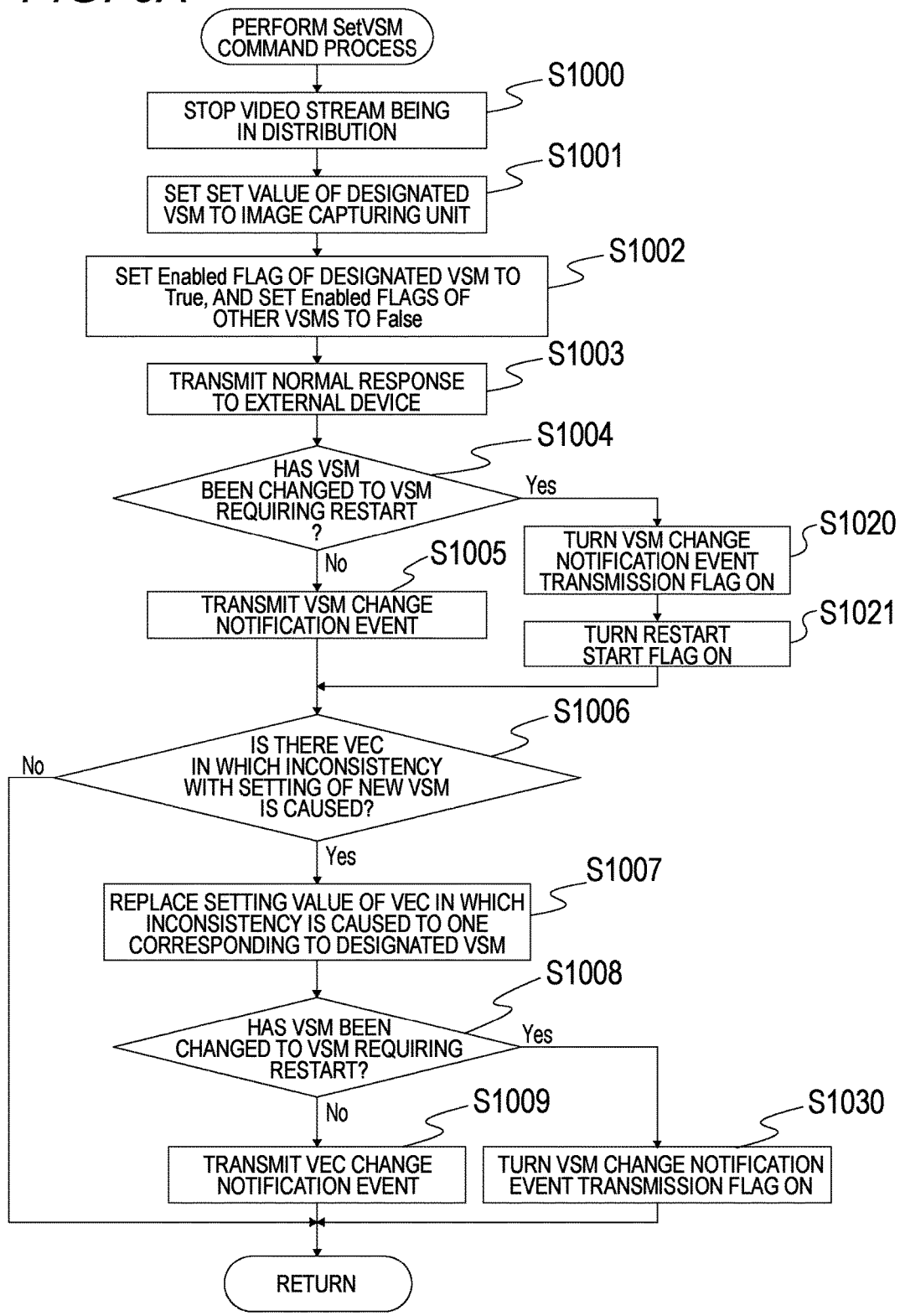
FIG. 6A is a flowchart illustrating a SetVSM command process by the transmission apparatus of the first embodiment.

FIG. 6A illustrates processes of when the monitoring camera 1000 has received the above-described SetVideoSourceMode command from the client 2000 (reception procedure). The SetVideoSourceMode command is a command that instructs a change of the VSM of the VideoSource 6101 generated by the client 2000 (for example, from S1 to S3 of FIG. 4).

In step S1000, the control unit 1001 stops a video stream being in distribution, through the communication unit 1005.

In step S1001, the control unit 1001 determines which of S1 to S3 is the input VSM, acquires a corresponding set value of the VSM from the storage unit 1002, and sets the set value to the image capturing unit 1003.

In step S1002, the control unit 1001 sets an Enable flag corresponding to the VSM determined in step S1001 to True, and sets Enable flags corresponding to other VSMs to False.

In step S1003, the control unit 1001 transmits a normal response to the client 2000. The normal response is the SetVideoSourceMode response illustrated in the transaction 7202 of FIG. 5B and the transaction 7399 of FIG. 5C.

In step S1004, the control unit 1001 refers to the set RebootFlag of the VSM, and determines whether the VSM has been changed to the VSM that requires restart. The control unit 1001 moves the process to step S1010 if the restart is required, and moves the process to step S1005 if not required.

In step S1005, the control unit 1001 transmits the VSM change notification event through the communication unit 1005 in order to notify the client on the network of the change of the VSM. As described above, the monitoring camera 1000 performs update notification by completion notification that indicates setting of at least one of the resolution, the frame rate, and the coding format of the captured data generate by the image capturing unit 1003 has been completed. The update notification notifies the client 2000 of a fact that the setting of the image capturing unit 1003 or the encoding unit 1004 has been updated.

In step S1020, the control unit 1001 sets a VSM change notification event transmission flag to ON. The flag is referred by the control unit 1001 in the restart process described below.

In step S1021, the control unit 1001 sets a restart start flag to ON. The flag is referred by the control unit 1001 after completion of the command processes, and the control unit 1001 executes the restart process (control procedure) following the command processes when the flag is ON.

In step S1006, the control unit 1001 refers to the table of FIG. 4 stored in the storage unit 1002, and determines whether the VSM after change is consistent with the currently set VEC. As described with reference to FIG. 4, the setting of the VEC includes the setting of the coding format (Encoding), the resolution (Resolution), and the maximum frame rate (FramerateLimit) of image data. When any of the plurality of VECs set to the monitoring camera 1000 is inconsistent, the control unit 1001 moves the process to step S1007.

Meanwhile, when there is no inconsistent VEC, the control unit 1001 terminates the process of the command. As described above, even if having received the change command of the VSM, the control unit 1001 does not perform update notification to the client 2000 when not updating the setting to the image data generated by the encoding unit 1004.

In step S1007, the control unit 1001 changes the parameter of the VEC in which the inconsistency is caused in step S1006 to have content consistent with the VSM after change (update procedure). Various implementation is considered for the method of changing the content of the parameter.

For example, a case of changing the VSM from the S3 mode to the S1 mode of FIG. 4 will be described.

Before the change of the VSM (VSM=S3), assume that the setting of the VEC is Encoding=JPEG, Resultion=320×240, and FramerateLimit=25 fps. In the example illustrated in FIG. 4, the setting of the VSM before the change and the setting of the VEC are consistent.

When the VSM is changed from S3 to S1, the setting of the VSM is changed to MaxResolution=3840×2160 (the proportions 16:9), MaxFramerate=20 fps, Encoding=H.264, and RebootFlag=False.

Meanwhile, the setting of the VEC remains Encoding=JPEG, Resolution=320×240 (the proportions 4:3), and FramerateLimit=25 fps.

At this time, Encoding, the proportions of Resolution, and FramerateLimit become inconsistent between the VSM after change and the set VEC.

Therefore, when the VSM is changed from S3 to S1, the setting of the VEC is changed such that Encoding is changed from JPEG to H.264, Resolution is changed from 320×240 to 960×540, and the FramerateLimit is changed from 25 fps to 20 fps.

Similarly, when the VEC is changed, and the VEC after change and the VSM become inconsistency, the VSM may be changed so that the VEC and the VSM can be consistent. Details of an example of changing the VSM will be described in a second embodiment.

When the monitoring camera 1000 automatically changes the VSM or the VEC so that the VSM and the VEC are changed from the inconsistent state to a consistent state, there may be a plurality of options of the set value of the VSM or the VEC to be automatically changed. In this case, the monitoring camera 1000 can automatically select and set a predetermined option from among the plurality of options of the set value.

For example, a case in which the VSM is changed to the VSM of S2 illustrated in FIG. 4 according to the command received from the client 2000, and the monitoring camera 1000 automatically changes the VEC to be consistent with the VSM (S2) will be described.

In this case, in the example of FIG. 4, as the set value of the coding system of the VEC after the automatic change, either H.264 or MPEG4 can be selected and set. Further, as the set value of Resolution of the VEC after the automatic change, any of 3200×2400, 2048×1536, 1024×768, and 640×480 can be selected and set. Further, as the setting of the frame rate after the automatic setting, the frame rate can be selected and set between 1 to 30 fps.

When there is a plurality of options of the set value that can be set by the monitoring camera 1000 when the VSM or the VEC is automatically changed, the method of selecting the option to be set is not particularly limited.

For example, a predetermined option can be automatically set from among the plurality of settable options (set values). For example, there are H.264 and MPEG4 as the settable options of Encoding, H.264 can be automatically set. Further, for example, when there is a plurality of resolutions as the settable options of Resolution, the maximum resolution (having the largest number of pixels) can be automatically set from among the resolutions.

Alternatively, a set value corresponding to the set value before change can be employed as the set value after change from among the plurality of settable options (set values).

For example, among the settable options of Resolution, resolution corresponding to Resolution before change may be automatically set. For example, the order of size of the resolution may be set such that the order before change and the order after change correspond to each other.

For example, when the VSM is changed from S2 to S1, and Resolution before change is 640×480 (the second resolution in descending order of size of the resolution), Resolution after change can be made to 1920×1080 (the second resolution in S1).

Further, for example, when the VSM is changed from S2 to S1, and FramerateLimit before change is 28 fps, FramerateLimit may be changed to FramerateLimit having the closest value to 28 fps from among FramerateLimits consistent with the VSM (S1) after change. That is, when VSM=S2 is changed to S1, FramerateLimit having 28 fps in S2 may be changed to FramerateLimit having 20 fps in S1.

Referring back to the description of the flowchart of FIG. 6A. In step S1008, the control unit 1001 determines whether the new VSM requires restart. The control unit 1001 can determine whether the restart is required by referring to the table illustrated in FIG. 4, and confirming whether RebootFlag of the new VSM is True or False. The control unit 1001 moves the process to step S1009 when the restart is not required (RebootFlag is False), and moves the process to step S1030 when the restart is required (RebootFlag is True).

As described above, when the restart is not required with the change of the VSM, the VEC change notification is notified to the client 2000 after the process of step S1007. Further, when the restart is performed with the change of the VSM, a VEC change notification event transmission flag is turned ON so that the VEC change notification is provided in accordance with the restart process described with reference to FIG. 6D.

In step S1009, the control unit 1001 transmits the VEC change notification (update notification) event through the communication unit 1005 in order to notify the client on the network of the change of the VEC. As described above, the monitoring camera 1000 performs the update notification in response to completion of the setting of at least any one of the resolution, the frame rate, and the coding format of the image data generated by the encoding unit 1004. The update notification notifies the client 2000 of the fact that the setting to the image capturing unit 1003 or the encoding unit 1004 has been updated.

In step S1030, the control unit 1001 sets the VEC change notification event transmission flag to ON. The flag is referred by the control unit 1001 in the restart process described below. When the flag is ON, the control unit 1001 transmits the VEC change notification event to the client 2000 after the restart process (notification procedure).

Figure 6B:
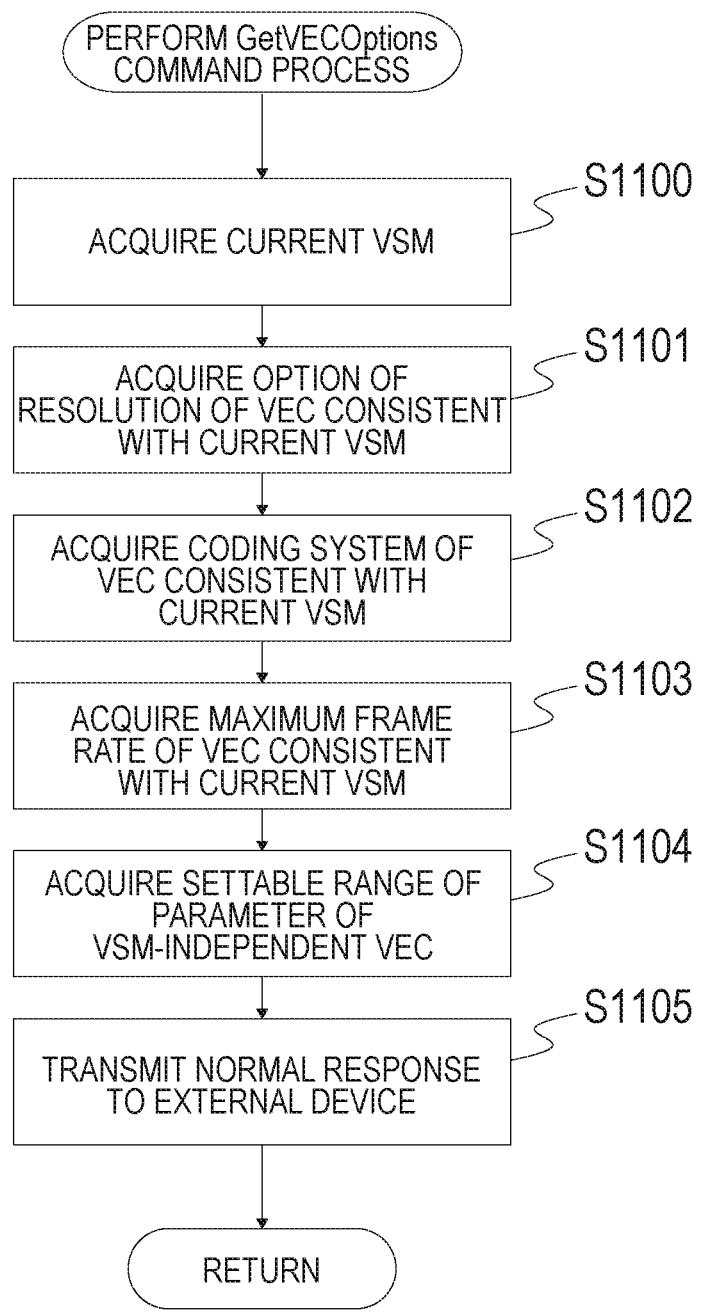
FIG. 6B is a flowchart illustrating a GetVideoOptions command process by the transmission apparatus of the first embodiment.

FIG. 6B illustrates a process of when the monitoring camera 1000 has received a GetVECOptions command from the client 2000. The GetVECOptions command is a command transmitted to the monitoring camera 1000 so that the client 2000 acquires the options of 4005, 4006, and 4007 illustrated in FIG. 4.

In step S1100, the control unit 1001 determines which of S1 to S3 is the VSM currently set to the VideoSource 6101 by referring to the Enable flag.

In step S1101, the control unit 1001 acquires the options of the coding format (Encoding) consistent with the current VSM by referring to the table of FIG. 4 stored in the storage unit 1002.

In step S1102, the control unit 1001 acquires the options of the resolution (Resolution) of the VEC consistent with the current VSM by referring to the table of FIG. 4 stored in the storage unit 1002.

In step S1103, the control unit 1001 acquires the options of the maximum frame rate (FramerateLimit) by referring to the table of FIG. 4 stored in the storage unit 1002.

For example, when the current VSM is S3, H.264 and JPEG are acquired as the options of the coding system Encoding. Further, 1024×768, 640×480, 320×240, and 176×144 are acquired as the options of Resolution. Further, 1 to 30 fps is acquired as FramerateLimit.

In step S1104, the control unit 1001 acquires the options and the setting ranges of the VEC independent of the current VSM from the storage unit 1002. For example, as the settable range of the encoding quality (Quality), 1 to 5 is acquired. Further, as the options of the maximum bit rate (BitrateLimit), 1 to 60 Mbps is acquired.

In step S1105, the control unit 1001 includes the options and the setting ranges acquired in steps S1101 to S1104 to a normal response, and returns the response to the client 2000 through the communication unit 1005.

Figure 6C:
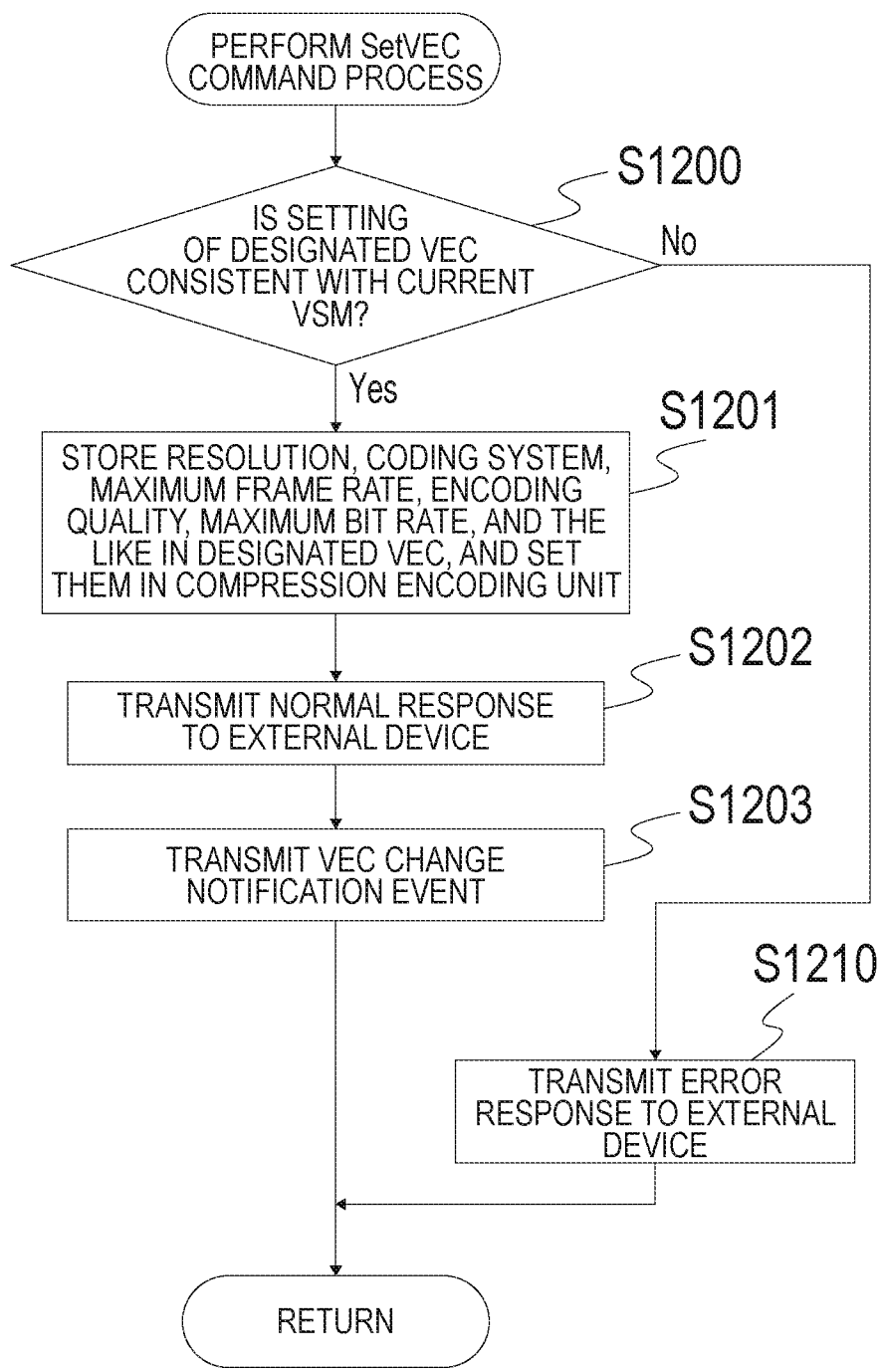
FIG. 6C is a flowchart illustrating a SetVEC command process by the transmission apparatus of the first embodiment.

FIG. 6C illustrates a process of when the monitoring camera 1000 has received the above-described SetVideoEncoderConfiguration command from the client 2000.

In step S1200, the control unit 1001 refers to the table of FIG. 4 stored in the storage unit 1002, and determines whether the resolution, the coding format, and the maximum frame rate input to SetVEC received by the command are consistent with the current VSM. When none of them is consistent, the control unit 1001 moves the process to step S1210.

In step S1201, the control unit 1001 stores the setting values of the VEC including the encoding quality, the maximum bit rate, the coding format, the maximum frame rate, and the resolution in the storage unit 1002, and sets the setting values to the encoding unit 1004.

In step S1202, the control unit 1001 transmits a normal response to the client 2000.

In step S1203, the control unit 1001 transmits the VEC change notification event through the communication unit 1005 in order to notify the client on the network of the change of the VEC.

In step S1210, the control unit 1001 transmits an error response to the client 2000.

Figure 6D:
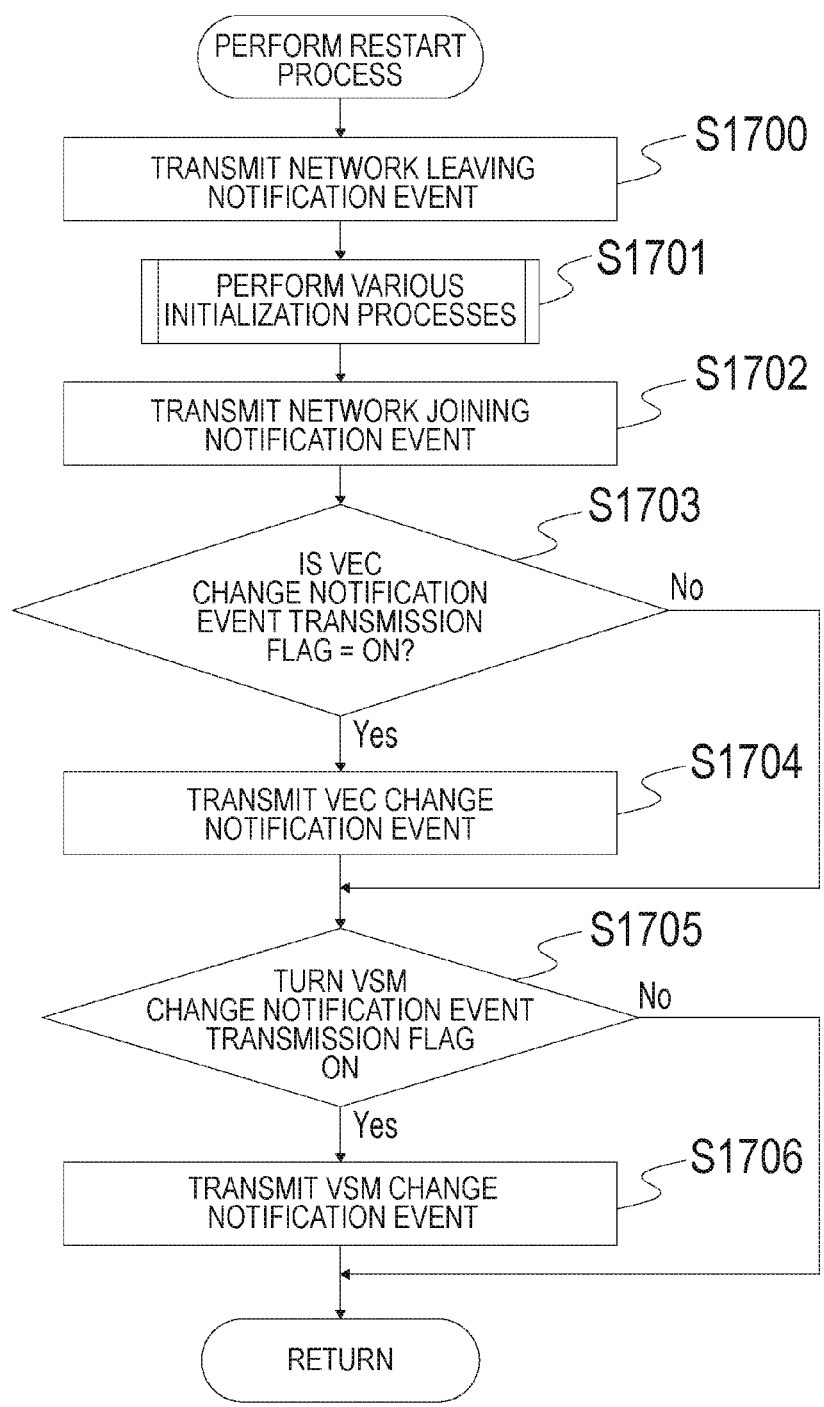
FIG. 6D is a flowchart illustrating restart process by the transmission apparatus of the first embodiment.

FIG. 6D is a restart process. The process is a process executed by the control unit 1001 when the restart start flag is ON after the transaction 7399 of the SetVideoSourceMode command in FIG. 5C.

That is, when having received the SetVideoSourceMode command, the monitoring camera 1000 executes the process of FIG. 6A. After completion of the process of FIG. 6A, when the restart start flag is ON, the restart process is performed in the transaction 7401 of FIG. 5C. The restart process is performed in the monitoring camera 1000 between the network leaving notification event and the network joining event of FIG. 5C.

In step S1700, the control unit 1001 transmits the network leaving notification event through the communication unit 1005 in order to notify the client on the network of start of restart.

In step S1701, the control unit 1001 performs an actual restart process of the monitoring camera 1000.

In step S1702, the control unit 1001 transmits the network joining notification event through the communication unit 1005 in order to notify the client on the network of completion of the restart.

In step S1703, the control unit 1001 determines the VEC change notification event transmission flag. When the flag is ON, the control unit 1001 moves the process to step S1704.

In step S1704, the control unit 1001 transmits the VEC change notification event through the communication unit 1005 in order to notify the client on the network of the change of the VEC.

In step S1705, the control unit 1001 determines the VSM change notification event transmission flag. When the flag is ON, the control unit 1001 moves the process to step S1706.

In step S1706, the control unit 1001 transmits the VSM change notification event through the communication unit 1005 in order to notify the client on the network of the change of the VSM.

Figure 7:
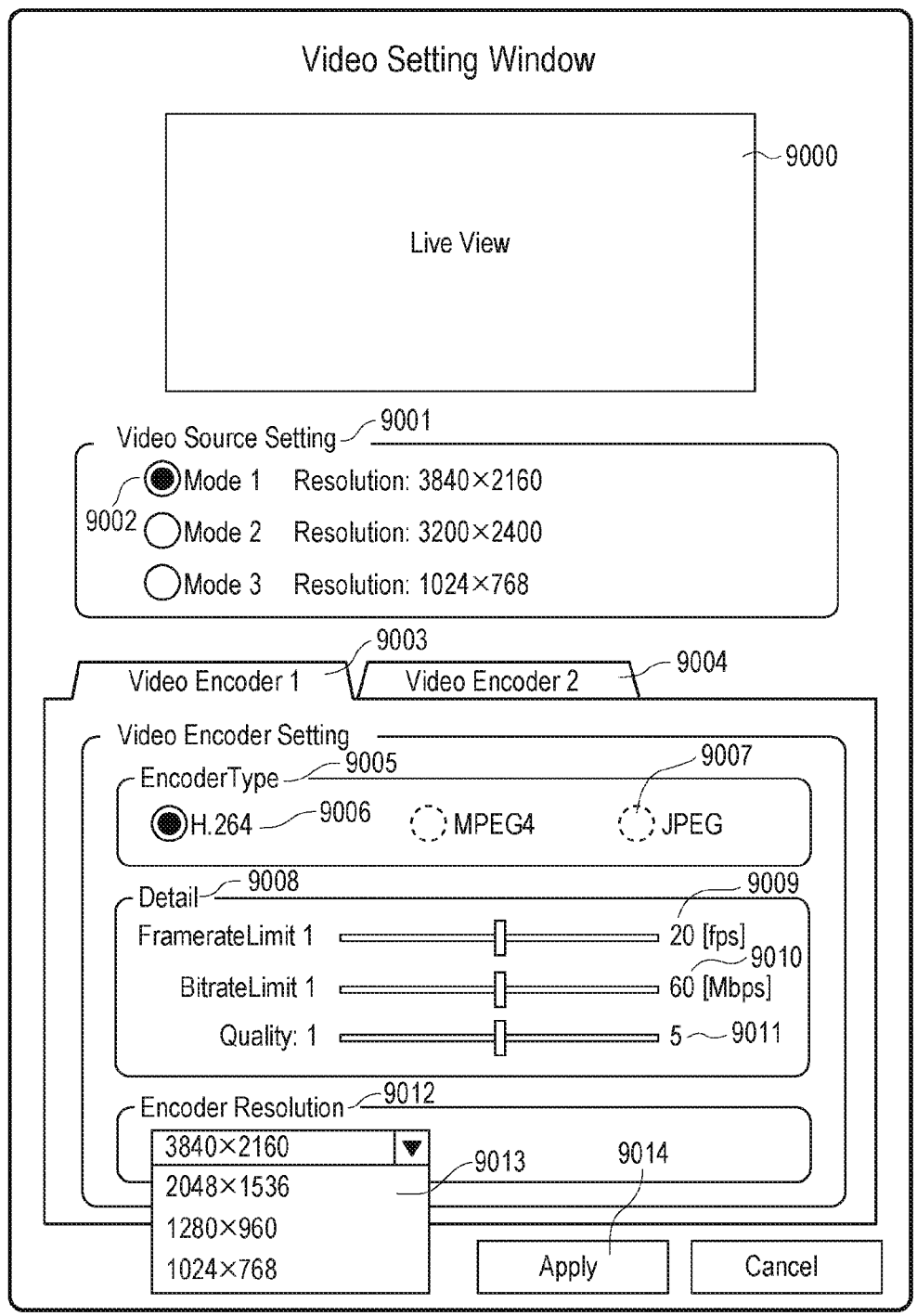
FIG. 7 is a diagram illustrating a first example of a user interface displayed in a client in the first embodiment.

FIG. 7 illustrates an example of a setting screen of the client 2000 in which setting of the VSM and the VEC of the monitoring camera 1000 in the present embodiment is performed. A control unit 2001 of the client 2000 illustrated in FIG. 2 executes a program stored in the storage unit 2002, thereby to control and display the setting screen in a display unit 2003.

An area 9000 is a LiveView area. When the setting screen is opened, the client 2000 executes the sequence described with reference to FIG. 5A, and displays a stream of a video image obtained in the transaction 7113 in the area 9000.

An area 9001 is a first setting area in which a graphical user interface (GUI) for setting the set value for generating captured data by the image capturing unit 1003 of the monitoring camera 1000 is displayed. In the present embodiment, the area 9001 is a VSM selection area. The client 2000 determines whether the monitoring camera 1000 handles switching of the VSM by means of the transaction 7099 of GetServiceCapabilities executed together when the setting screen is opened.

When the monitoring camera 1000 handles the switching of the VSM, the client 2000 lists the VSM that can be changed through the transaction 7200 of GetVideoSourceMode so that the user can select the VSM (area 9002).

In the area 9002, when a VSM different from the current setting is selected, the communication unit 2004 of the client 2000 transmits the SetVideoSourceMode command to the monitoring camera 1000, and changes the VSM of the monitoring camera 1000. As described above, when the set value (for example, the VSM) for generating captured data is changed through the GUI displayed in the first setting area, the client 2000 transmits a command that sets the changed set value to the monitoring camera 1000.

The transmission of the SetVideoSourceMode command executed according to the mode selection in the first setting area corresponds to the process executed by the client 2000 in the transaction 7202 of FIG. 5B and the transaction 7399 of FIG. 5C.

Here, the transaction 7200 of FIG. 5B may be omitted. This is because, as described above, the client 2000 can determine whether the monitoring camera 1000 handles the switching of the VSM by means of the transaction 7099 of GetServiceCapabilities executed together when the setting screen is opened.

When having received the SetVideoSourceMode command transmitted from the client 2000, the monitoring camera 1000 executes the SetVideoSourceMode command process described with reference to FIG. 6A.

When the restart is required with the change of the VSM, the monitoring camera 1000 executes the restart process illustrated in FIG. 6D after executing the process of FIG. 6A. The restart process is executed between the network leaving event and the network joining event of the transaction 7401 of FIG. 5C.

Meanwhile, when the restart is not required with the change of the VSM, the monitoring camera 1000 transmits the VEC change notification to the client 2000 without performing the restart process, as illustrated in step S1009 of FIG. 6A.

When the VSM is changed by the process of FIG. 6A in the monitoring camera 1000, the client 2000 receives the VideoSourceModechange notification from the monitoring camera 1000 (the transaction 7202 of FIG. 5B and the event 7402 of FIG. 5C).

When having received the VideoSouceModechange notification, the client 2000 executed the transactions 7204 and 7205 illustrated in FIGS. 5B and 5C, and acquires an updated VEC from the monitoring camera 1000.

When having acquired the updated VEC from the monitoring camera 1000, the client 2000 updates the display of the setting screen, and displays the options and the setting ranges of the updated parameters of VideoEncoder. Accordingly, the client 2000 can always present the options and the setting ranges of the set values of the VEC consistent to the VSM to the user.

Tabs 9003 and 9004 are second setting areas that display graphical user interfaces for setting the set values used by the encoding unit 1004 of the monitoring camera 1000 to generate image data. In the present embodiment, the tabs 9003 and 9004 are used by the user to change the set values of the VEC 6103 of the monitoring camera 1000. By selecting the tab, the user can switch VideoEncoder to which the setting is performed. When the user selects the tab, the setting screen of VideoEncoder corresponding to the selected tab is displayed.

While the number of tabs in the example illustrated in FIG. 7 is two, the number of tabs according to the number of the VECs 6103 supported by the monitoring camera 1000 and obtained by the GetVideoEncoderConfigurations command can be displayed.

An area 9005 is an area in which the user is prompted to select a coding format of the VECs. In the area 9005, the options of the coding format obtained through the transaction 7106 of FIG. 5A are displayed. Further, in the area 9005, the options of the coding format obtained through the transaction 7204 of FIG. 7B when the new VSM has been selected in the VSM selection area.

An area 9006 indicates the coding formats that can be set to the monitoring camera 1000 of when the setting screen of FIG. 7 is opened or the monitoring camera 1000 in which the new VSM has been set. Further, an area 9007 indicates the coding formats that cannot be selected to the monitoring camera 1000 of when the setting screen of FIG. 7 is opened or the monitoring camera 1000 in which the new VSM has been set.

An area 9008 is a Detail area in which the maximum frame rate, the maximum bit rate, and the encoding quality included in the VEC 6103 are selected.

An area 9009 indicates, with a scroll bar, the range of the frame rate that can be set to the monitoring camera 1000 of when the setting screen of FIG. 7 is opened or the monitoring camera 1000 in which the new VSM has been set. The range of the frame rate displayed in the area 9009 is determined based on the maximum frame rate obtained through the transaction 7106 illustrated in FIG. 5A or the transaction 7204 illustrated in FIG. 5B.

An area 9010 indicates, with a scroll bar, the range of the bit rate that can be set to the monitoring camera 1000 of when the setting screen of FIG. 7 is opened or the monitoring camera 1000 in which the new VSM has been set. The range of the bit rate displayed in the area 9010 is determined based on the maximum bit rate obtained through the transaction 7106 illustrated in FIG. 5A or the transaction 7204 illustrated in FIG. 5B.

An area 9011 indicates, with a scroll bar, the range of the encoding quality that can be set to the monitoring camera 1000 of when the setting screen of FIG. 7 is opened or the monitoring camera 1000 in which the new VSM has been set. The range of the encoding quality displayed in the area 9010 is determined based on the encoding quality obtained through the transaction 7106 illustrated in FIG. 5A or the transaction 7204 illustrated in FIG. 5B.

An area 9012 is an area in which the resolution of the VEC 6103 is selected. In a dropdown list of an area 9013, the options of the parameter of the coding format obtained through the transaction 7106 illustrated in FIG. 5A or the transaction 7204 illustrated in FIG. 5B.

A button 9014 is an Apply button. When the Apply button is pressed by the user, the client 2000 transmits the SetVideoEncoderconfiguration command to the monitoring camera 1000. By the transmission of the command, the parameters selected in the areas 9005, 9008, and 9012 are set to the encoding unit of the monitoring camera 1000.

Figure 12:
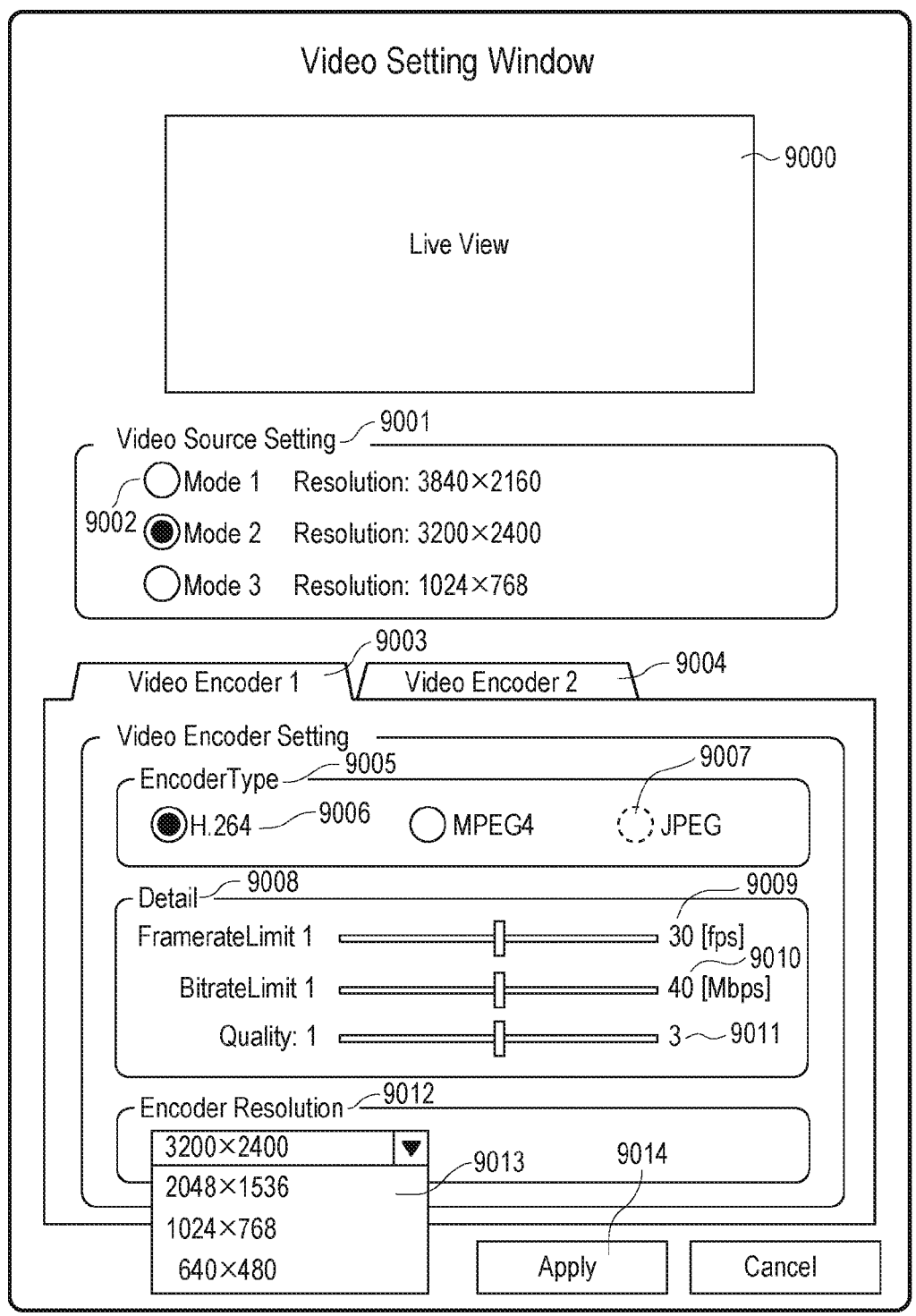
FIG. 12 is a diagram illustrating a second example of a user interface displayed in a client in the first embodiment.

An example of the setting screen of when the VSM mode is changed from Mode 1 to Mode 2 is illustrated in FIG. 12. When the VSM mode is changed, the setting ranges of the VEC displayed on the tabs 9003 and 9004 are changed to the setting ranges consistent with the VSM mode of Mode 2 with reference to the table of FIG. 4. That is, the coding format that can be selected in the area 9005 is H.264 or MPEG4. Further, the settable frame rate in the area 9008 is from 1 to 30 fps. Further, the options of the resolution that can be selected in the area 9012 are changed.

According to the monitoring camera 1000 in the present embodiment, when the VSM is changed according to the command received from the client 2000, the setting content of the VEC can be updated to the content consistent with the VSM after change.

As described above, when the setting related to the generation of the image data in the image capturing unit 1003 is changed, the setting related to the generation of the image data in the image capturing unit 1003 and the setting related to the image data in the encoding unit 1004 can be consistent with each other.

For example, when the setting of the resolution of the image data generated by the image capturing unit 1003 has been changed, the setting of the resolution of the image data generated by the image capturing unit 1003 and the setting of the resolution of the image data generated by the encoding unit 1004 can be consistent with each other. For example, the proportions of the image data generated by the image capturing unit 1003 and the proportions of the resolution of the image data generated by the encoding unit 1004 can be consistent with each other.

Further, when having changed the VEC with the change of the VSM, the monitoring camera 1000 in the present embodiment prompts the client 2000 to reacquire the content of the VEC regardless of whether the setting of requiring restart with the setting of the new VSM is made. That is, when having set the set value of the captured data generated by the image capturing unit 1003 according to the received command, the monitoring camera 1000 transmits, to the client 2000, the update notification that indicates the monitoring camera 1000 has automatically updated the setting of the set value of the image data generated by the encoding unit 1004 regardless of whether performing the restart process. Here, in the present embodiment, the set value includes a set value of at least one of the resolution, the frame rate, and the coding format.

Accordingly, the set value to the image capturing unit 1003 of the monitoring camera 1000 and the set value to the encoding unit 1004 can be consistent with each other between the monitoring camera 1000 and the client 2000.

Further, the monitoring camera 1000 in the present embodiment changes, when having changed the VSM, the content of the options provided as a response to the GetVECOptions command transmitted by the client 2000. At this time, the options are returned after being changed to be consistent with the VSM after change.

As described above, when the encoding setting of the monitoring camera 1000 is changed, the setting to the monitoring camera 1000 performed in the client 2000 can be appropriately performed.

Second Embodiment

While, in the first embodiment, a case of notifying the options consistent with the VSM as the options of the set values of the encoding unit 1004 provided as a response to the received GetVECOptions command has been described, the embodiment is not limited to the case.

In the present embodiment, a case of providing a client 2000 with options including a set value other than a set value consistent with a VSM as a response to a GetVECOptions command will be described. Note that, when all possible values that can be set as the set values to an encoding unit 1004 of a monitoring camera 1000 are consistent with a current VSM, all responses to the GetVECOptions command are set values consistent with the VSM.

In the present embodiment, the options to be notified to the client 2000 as a response to the GetVECOptions command are not dependent on the currently set VSM.

Further, in the present embodiment, a case in which the monitoring camera 1000 switches the VSM to be consistent with set values of the encoding unit 1004 set by the client 2000 with a SetVideoEncoderConfiguration command. Note that description of the content already described in the first embodiment is omitted.

A configuration of a monitoring camera system, a configuration of the monitoring camera 1000, and a configuration of a parameter held by the monitoring camera 1000 according to the present embodiment are the same as the content described with reference to FIGS. 1 to 3 in the first embodiment. Therefore, description is omitted.

Further, in the present embodiment, an example of VSMs supported by the monitoring camera 1000 and the content of a settable range of a VEC 6103 consistent with each VSM will be described with reference to the table of FIG. 4, similarly to the first embodiment.

Next, command sequences between the monitoring camera 1000 and the client 2000 will be described. A command sequence from start of setting to distribution of a video image between the monitoring camera 1000 and the client 2000 is the same as the content described with reference to FIG. 5A in the first embodiment, and therefore, description is omitted.

Figure 8A:
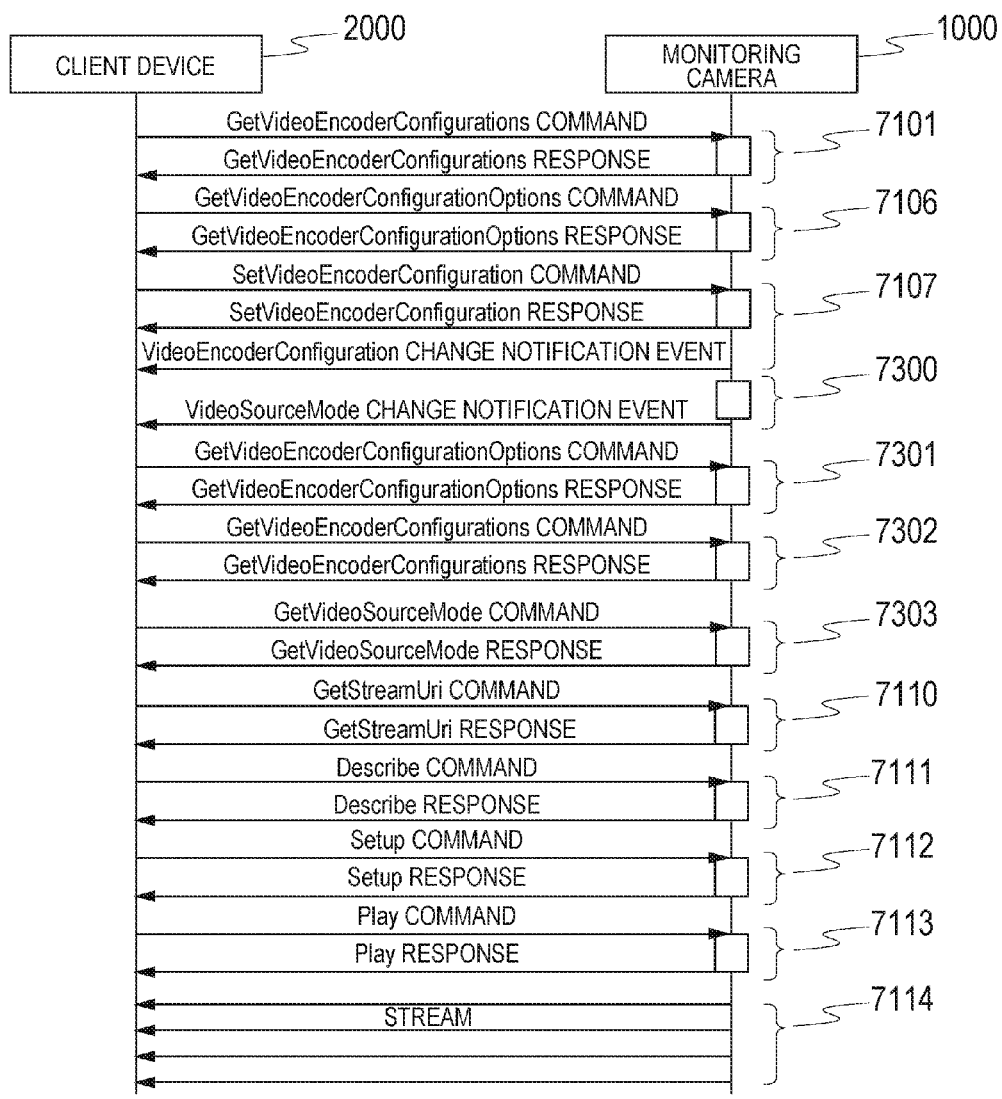
FIG. 8A is a diagram illustrating a command sequence of when output resolution of an encoding unit is changed between a transmission apparatus and a reception apparatus in a second embodiment.

Next, a command sequence of when output resolution of the encoding unit 1004 is changed between the monitoring camera 1000 and the client 2000 in the present embodiment will be described with reference to FIG. 8A.

Transactions described with reference to FIG. 5A in the first embodiment are denoted with the same reference signs as FIG. 5A, and description is omitted.

An event 7300 is a process of updating a VSM so that the inconsistency caused between the VSM and a VEC caused due to a setting change of the VEC illustrated in a transaction 7107.

In the event 7300, when a newly set VSM does not require restart, the control unit 1001 of the monitoring camera 1000 transmits a VSM change notification event to the client 2000, and prompts the client on the network to reacquire the VSM.

A transaction 7301 is a transaction of the GetVECOptions command.

A transaction 7302 is a command of a GetVideoEncoderConfigurations command.

The client 2000 that has received the VEC change notification event illustrated in the transaction 7107 acquires the set value of the VEC updated through the transaction 7301. Further, the client 2000 that has received the VEC change notification event illustrated in the transaction 7107 acquires the options of the set value of the VEC updated through the transaction 7302.

A transaction 7303 is a command of a GetVideoSourceMode command. The client 2000 that has received the VSM change notification event illustrated in the event 7300 can confirm the update of the VSM by referring to an Enable flag included in the updated VSM in the transaction 7303.

Figure 8B:
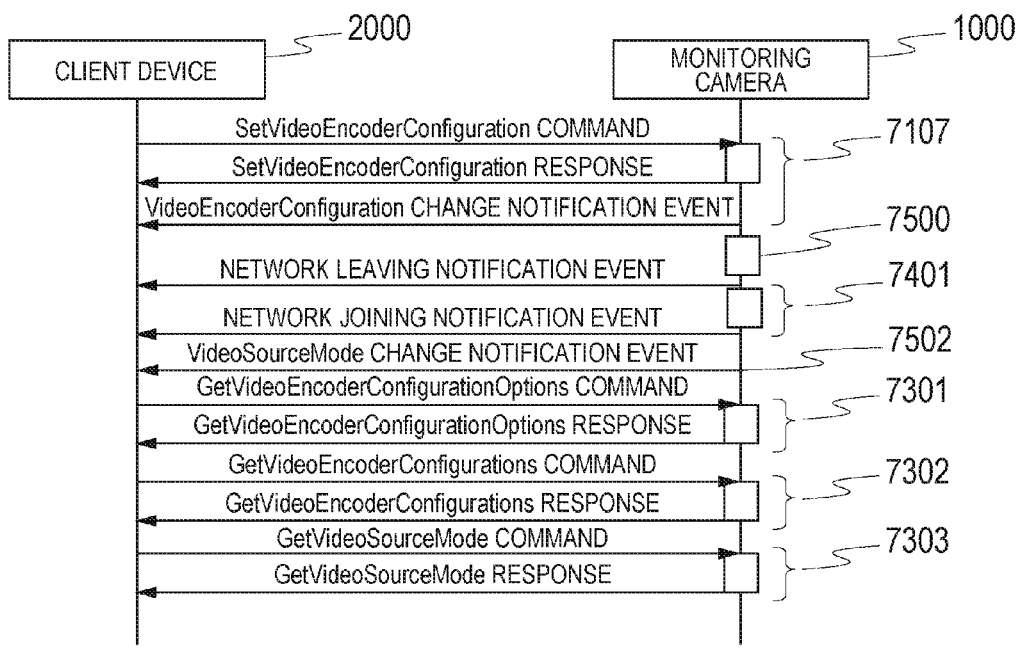
FIG. 8B is a diagram illustrating a command sequence of when resolution of image data output from the encoding unit is changed, and when newly set VSM involves restart between the transmission apparatus and the reception apparatus in the second embodiment.

Next, a command sequence of when the resolution of the image data output by the encoding unit 1004 and when the newly set VSM involves restart between the monitoring camera 1000 and the client 2000 will be described with reference to FIG. 8B. Transaction described with reference to FIG. 8A are denoted with the same reference signs as FIG. 8A, and description is omitted.

A process 7500 illustrates a process of updating the VSM so as to eliminate the inconsistency between the VSM and the VEC caused due to the setting change of the VEC illustrated in the transaction 7107. Here, when the VSM is updated to a VSM that requires restart at updating, the monitoring camera 1000 does not transmit the VSM change notification event.

An event 7502 is the VSM change notification event, and the monitoring camera 1000 transmits the event 7502 to the client 2000 after restart, and prompts the client to reacquire the set value.

Processes performed by the monitoring camera 1000 in the present embodiment will be described with reference to FIGS. 9A and 9B. In an embodiment in which a processor is built in the control unit 1001 of the monitoring camera 1000, the process flows of FIGS. 9A and 9B indicate a program for causing the control unit 1001 to execute the procedures illustrated in FIGS. 6A to 6D. The processor built on the control unit 1001 is a computer, and executes a program read out from the storage unit 1002 built in the monitoring camera 1000.

Figure 9A:
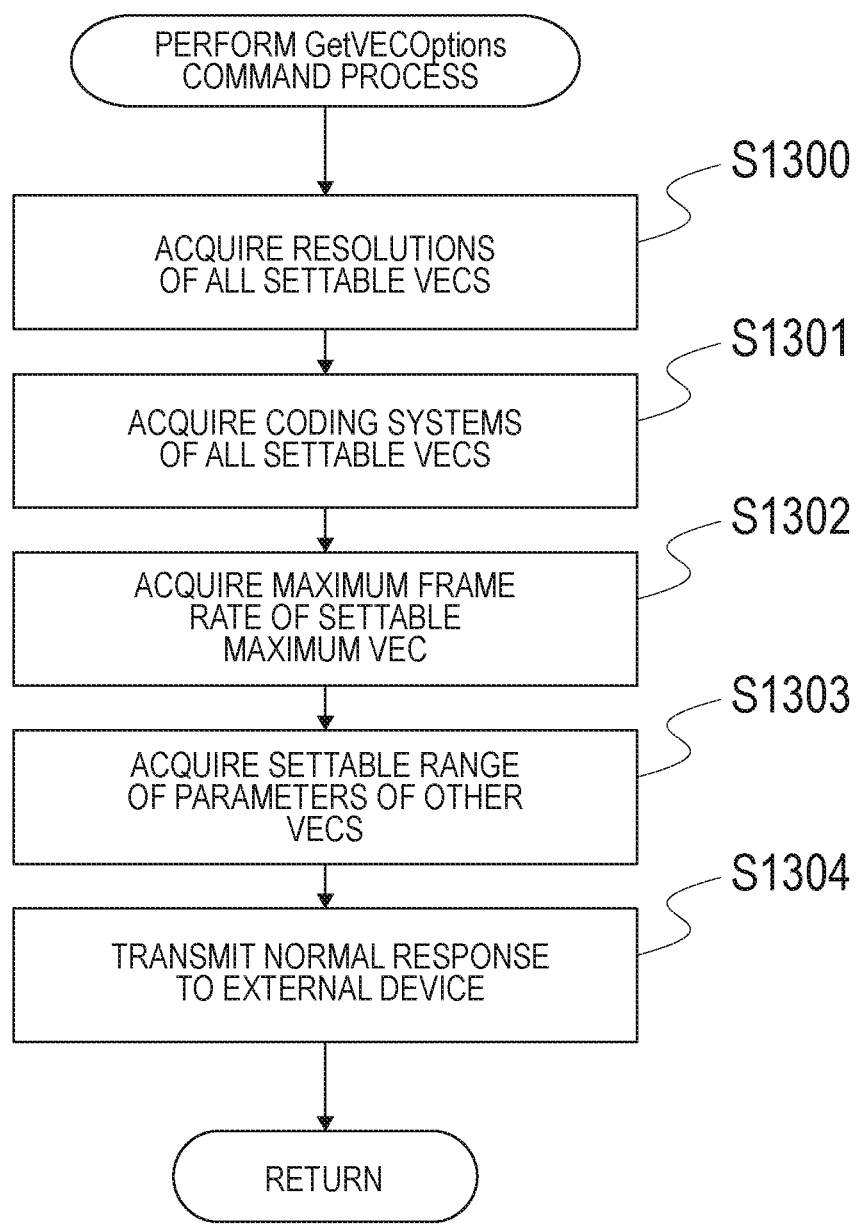
FIG. 9A is a flowchart illustrating an operation of the transmission apparatus in the second embodiment.

FIG. 9A illustrates a process of when the monitoring camera 1000 has received a GetVideoSourceConfigurationOptions command from the client 2000. Here, the GetVideoSourceConfigurationOptions command is a command for requesting notification of the options of the set value that can be set to an image capturing unit 1003 of the monitoring camera 1000 from the client 2000 to the monitoring camera 1000. Hereinafter, the GetVideoSourceConfigurationOptions command is represented as GetVSCOptions command.

In step S1300, the control unit 1001 refers to the table of FIG. 4 stored in a storage unit 1002, and acquires the options of the VEC including set values other than the set value consistent with the set VSM.

In step S1301, the control unit 1001 refers to the table of FIG. 4 stored in the storage unit 1002, and acquires the options of a coding format of the VEC including set values other than the set value consistent with the VSM. In the example of FIG. 4, the control unit 1001 acquires JPEG, MPEG4, and H.264.

In step S1302, the control unit 1001 refers to the table of FIG. 4 stored in the storage unit 1002, and acquires a value of a maximum frame rate of the VEC including set values other than the set value consistent with the set VSM. In the example of FIG. 4, the control unit 1001 acquires 30 fps.

In step S1303, the control unit 1001 acquires options and setting ranges of the VEC from the storage unit 1002. For example, 1 to 5 as a settable range of the encoding quality, and 60 Mbps as the set value of the maximum bit rate are acquired.

In step S1304, the control unit 1001 includes the options and the setting ranges acquired in steps S1300 to S1303 to a normal response, and returns the response to the client 2000 through a communication unit 1005.

Figure 9B:
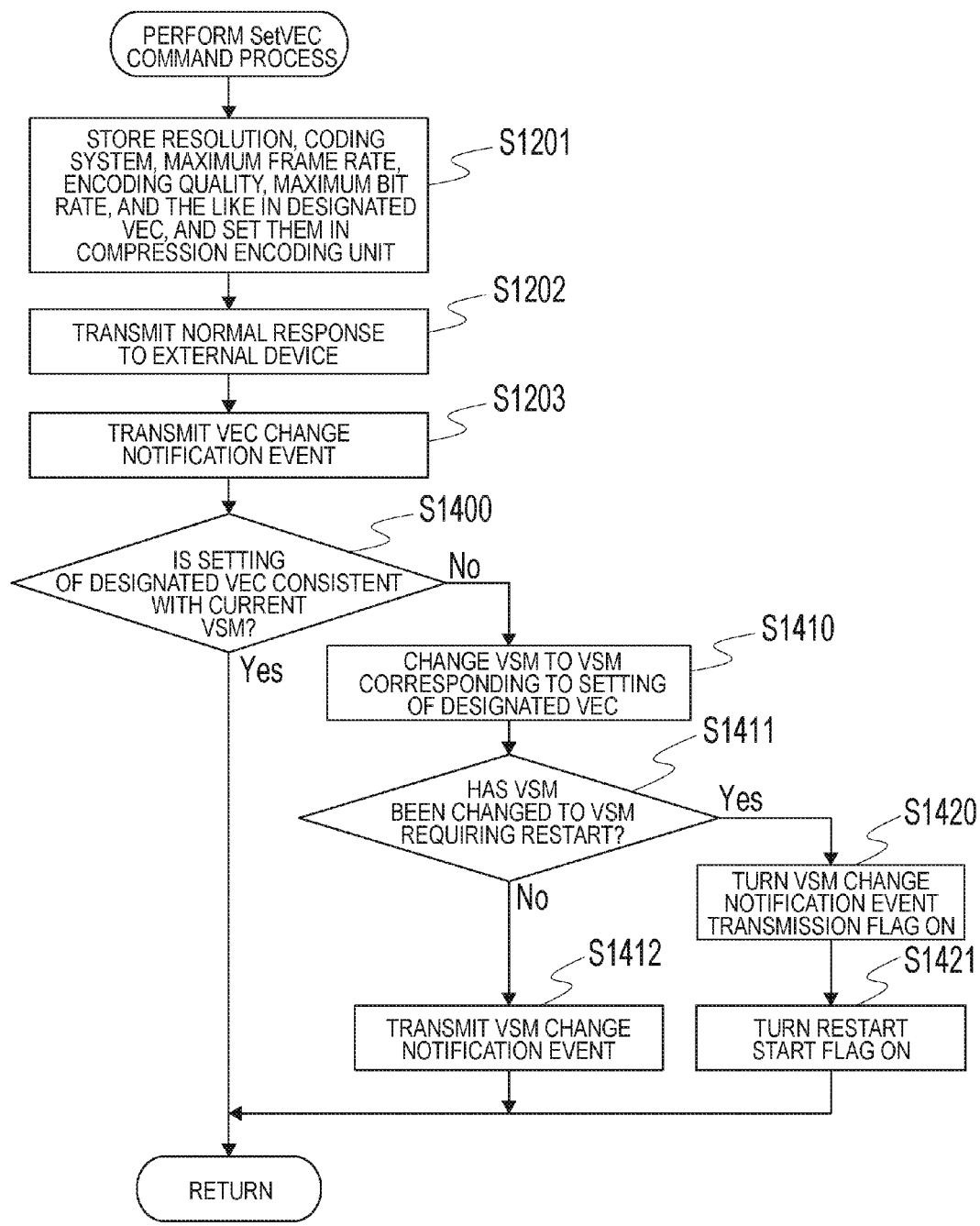
FIG. 9B is a flowchart illustrating a SetVEC command process of the transmission apparatus in the second embodiment.

FIG. 9B illustrates a process of when the monitoring camera 1000 has received a SetVideoEncoderConfiguration command from the client 2000.

Processes described with reference to FIG. 6C in the first embodiment is denoted with the same reference signs, and description is omitted.

In step S1400, the control unit 1001 refers to the table of FIG. 4 stored in the storage unit 1002, and determines whether the coding format, the resolution, and the maximum frame rate set to the received VEC are consistent with the current VSM.

When consistent, the control unit 1001 terminates the command process. As described above, when having received the change command of the VEC and when does not change the setting to the image data generated by the image capturing unit 1003, the control unit 1001 does not perform update notification to the client 2000.

In not consistent, the control unit 1001 moves the process to step S1410. In step S1410, the control unit 1001 refers to the table of FIG. 4 stored in the storage unit 1002, and switches the setting to the VSM consistent with the input VEC. For example, when the VSM is S1, a command that causes the resolution of the encoding unit 1004 to be 640×480, the VSM is switched to S3 consistent with the resolution.

In step S1411, the control unit 1001 refers to the set RebootFlag of the VSM, and determines whether the VSM has been changed to the VSM that requires restart. The control unit 1001 moves the process to step S1010 if the restart is required, and moves the process to step S1005 if not required.

In step S1412, the control unit 1001 transmits the VSM change notification event through the communication unit 1005 in order to notify the client on the network of the change of the VSM. As described above, when having updated the setting (VSM) of the captured data generated by the image capturing unit 1003 so as to be consistent with the VEC after change according to the change command of the VEC, the control unit 1001 performs update notification that indicates the VSM has been changed even if the restart is not required with the change of the VSM.

In step S1411, the control unit 1001 refers to RebootFlag of the updated VSM, and determines whether the VSM has been changed to the VSM that requires the restart. The control unit 1001 moves the process to step S1420 when the restart is required (RebootFlag is True), and moves the process to step S1412 when the restart is not required (RebootFlag is False).

In step S1412, the control unit 1001 transmits the VSM change notification event through the communication unit 1005 in order to notify the client 2000 on the network of the change of the VSM.

In step S1420, the control unit 1001 sets a VSM change notification event transmission flag to ON.

In step S1421, the control unit 1001 sets a restart start flag to ON.

A restart process is the same as the content described with reference to FIG. 6D in the first embodiment, and therefore, description is omitted. In the restart process, as described below, the fact that the VSM has been changed is notified to the client 2000.

As described above, when the VSM is changed to be consistent with the VEC after change according to the change command of the VEC, the control unit 1001 performs the update notification that indicates the VSM has been changed regardless of whether the restart is required with the change of the VSM.

That is, when having updated the set value (VSM) for generating the captured data according to a command from the client 2000, the control unit 1001 performs the notification (VSM change notification) through the network regardless of whether performing the restart process. The VSM change notification is a notification for causing the client 2000 to acquire the updated VSM.

A setting screen of the client 2000 in which the setting of the VSM and the VEC of the monitoring camera 1000 in the present embodiment is performed will be described with reference to FIG. 7.

In a dropdown list of an area 9103, the content of the options of the parameter of the coding format acquired by GetVECOptions executed when the setting screen is opened is displayed. In the dropdown list of the area 9103 in the present embodiment, the options of the coding formats including a coding format other than the coding format consistent with the set VSM are displayed.

A communication unit 2004 of the client 2000 transmits, when the set value set to the encoding unit 1004 of the monitoring camera 1000 is changed using the dropdown list of a tab 9003 or a tab 9004, a command that sets the changed set value to the monitoring camera 1000. The command that sets the changed set value is, for example, the SetVideoEncoderConfiguration command in the present embodiment.

The communication unit 2004 of the client 2000 receives the VSM change notification event when the monitoring camera 1000 has changed the setting (for example, the VSM) for generating the captured data according to the SetVideoEncoderConfiguration command.

When having received the VSM change notification event, the client 2000 refers to an Enable flag acquired by transmission of the GetVideoSourceMode command, determines an updated and effective VSM, and reflects the VSM to a VSM selection area 9001. The GetVideoSourceMode command is an acquisition request of the set value for generating the captured data.

Other parts of the setting screen are the same as the content described in the first embodiment, and therefore, description is omitted.

In the second embodiment, the monitoring camera 1000 provides the client 2000 with all of the setting content of the VEC that can be set to the encoding unit 1004 as the options regardless of the current setting of the VSM.

When a parameter of the VEC, which is not consistent with the current VSM, is designated by the client, the monitoring camera 1000 of the present embodiment automatically updates the VSM to the VSM consistent with the newly set VEC.

Further, when the VEC has been updated, the monitoring camera 1000 prompts the client to reacquire the content of the VSM regardless of whether the newly set VSM requires restart.

As described above, when the setting related to the generation of the image data in the encoding unit 1004 is changed, the setting related to the generation of the image data in the image capturing unit 1003 and the setting related to the image data in the encoding unit 1004 can be consistent with each other.

For example, when the setting of the resolution of the image data generated by the encoding unit 1004 has been changed, the setting of the resolution of the image data generated by the image capturing unit 1003 and the setting of the resolution of the image data generated by the encoding unit 1004 can be consistent with each other. For example, the proportions of the image data generated by the image capturing unit 1003 and the proportions of the resolution of the image data generated by the encoding unit 1004 can be consistent with each other.

Further, when having changed the VSM with the change of the VEC, the monitoring camera 1000 in the present embodiment prompts the client 2000 to reacquire the content of the VEC regardless of whether the setting of requiring restart with the setting of the new VSM is made.

Accordingly, the set value to the image capturing unit 1003 of the monitoring camera 1000 and the set value to the encoding unit 1004 can be consistent with each other between the monitoring camera 1000 and the client 2000.

Third Embodiment

In the first and second embodiments, as a method of prompting the client to reacquire the setting value of the VSM, a method of transmitting the VSM change notification event from the monitoring camera 1000 to the client 2000 has been described. Further, in the first and second embodiments, as the method of prompting the client 2000 to reacquire the set value of the VEC, a method of transmitting the VEC change notification event from the monitoring camera 1000 to the client 2000 has been described. However, the methods of notifying the VSM and the VEC are not limited to the above methods.

In a third embodiment, a case of transmitting, from a monitoring camera 1000 to a client 2000, a leaving notification event and a network joining notification event from the network, and prompting the client 2000 to reacquire a set value of a VSM or a VEC will be described. In the present embodiment, the monitoring camera 1000 performs update notification that notifies the setting of the image data generated by the encoding unit 1004 has been updated by means of reconnection notification that indicates the monitoring camera 1000 has been reconnected to the network after leaving the network. Note that, about the content already described in the first and second embodiments, description is omitted.

A configuration of a monitoring camera system, a configuration of the monitoring camera 1000, and a configuration of a parameter held by the monitoring camera 1000 according to the present embodiment are the same as the content described with reference to FIGS. 1 to 3 in the first embodiment. Therefore, description is omitted.

Further, in the present embodiment, an example of VSMs supported by the monitoring camera 1000 and the content of a settable range of a VEC 6103 consistent with each VSM will be described with reference to the table of FIG. 4, similarly to the first embodiment.

Next, command sequences between the monitoring camera 1000 and the client 2000 will be described. A command sequence from start of setting to distribution of a video image between the monitoring camera 1000 and the client 2000 is the same as the content described with reference to FIG. 5A in the first embodiment, and therefore, description is omitted.

Figure 10A:
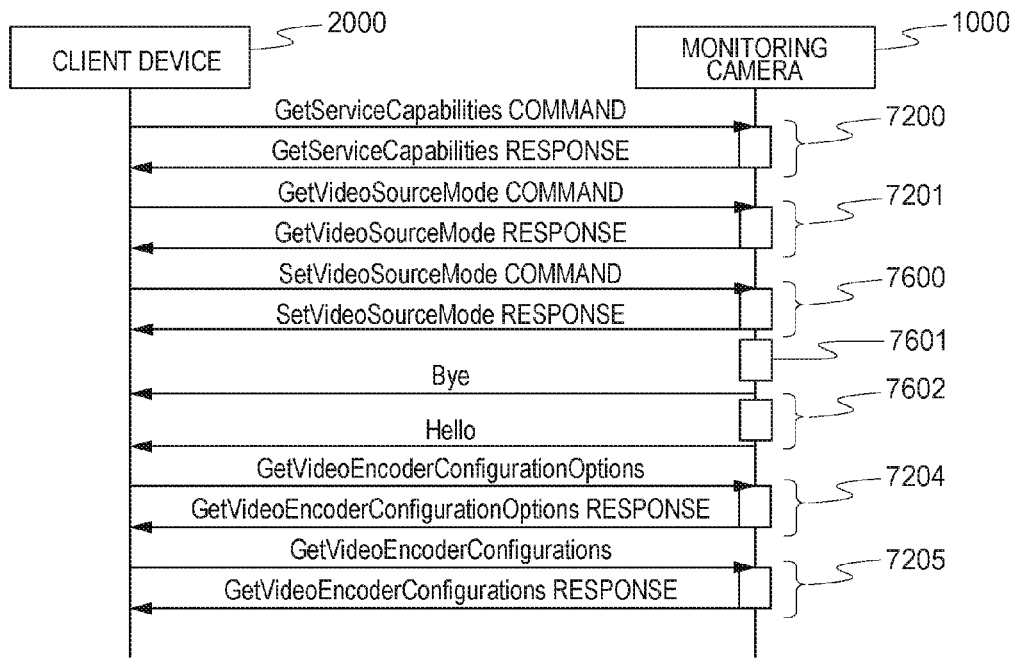
FIG. 10A is a diagram illustrating a command sequence from a setting change of VSM to distribution of a video image between a transmission apparatus and a reception apparatus in a third embodiment.

Next, a command sequence from change of setting of the VSM to distribution of a video image between the monitoring camera 1000 and the client 2000 of the present embodiment will be described with reference to FIG. 10A. In FIG. 10A, the content similar to FIG. 5B is denoted with the same reference signs, and description is omitted.

A transaction 7600 is a transaction of a SetVideoSourceMode command. The SetVideoSourceMode command is a command used by the client 2000 for instructing the monitoring camera 1000 to change the VSM of VideoSource 6101.

A process 7601 is a process of updating the inconsistency caused between the VSM and the VEC due to switching of SetVideoSourceMode in the transaction 7600.

A process 7602 is a process in which the control unit 1001 of the monitoring camera 1000 transmits a network leaving notification event (Bye) and a network joining notification event (Hello) in order to notify the client on the network of the VSM and the change of the VEC. Here, when the switching of the VSM in the transaction 7600 requires restart, a restart process of the monitoring camera 1000 can be performed between the network leaving notification event and the network joining notification event.

When having received the network joining notification event (Hello), the client 2000 transmits an acquisition request of the set value in order to acquire the set value (VEC) set to the monitoring camera 1000.

That is, the client 2000 transmits GetVideoEncoderConfigurationsOptions. Then, the client 2000 receives a GetVideoEncoderConfigurationsOptions response in response to the GetVideoEncoderConfigurationsOptions command (a process 7204).

Following that, the client 2000 transmits a GetVideoEncoderConfigurations command to the monitoring camera 1000. The client 2000 then acquires the VEC after the update as a response to the GetVideoEncoderConfigurations command (a process 7205).

Figure 10B:
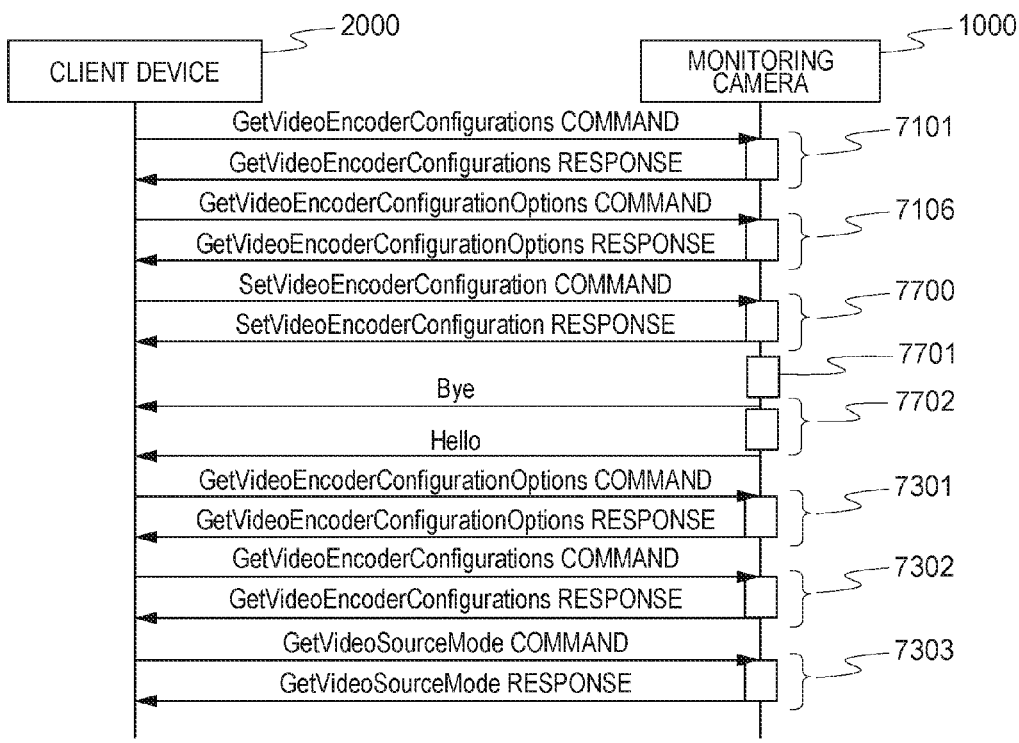
FIG. 10B is a diagram illustrating a command sequence of when output resolution of an encoding unit is changed between the transmission apparatus and the reception apparatus in the third embodiment.

FIG. 10B illustrates a command sequence of when output resolution of the encoding unit 1004 is changed between the monitoring camera 1000 and the client 2000. In FIG. 10B, the content described with reference to FIG. 5D in the first embodiment is denoted with the same reference signs, and description is omitted.

A transaction 7700 is a transaction of a SetVideoEncoderConfiguration command. In the transaction 7700, the client 2000 sets parameters of the VEC.

A transaction 7701 is a process of updating the VSM in order to eliminate the inconsistency caused between the VSM and the VEC due to setting change of the VEC in the transaction 7700.

A process 7702 is a process in which the control unit 1001 of the monitoring camera 1000 transmits the network leaving notification event and the network joining notification event in order to notify the client on the network of the VEC and the change of the VSM. Here, when the switching of the VSM illustrated in the transaction 7701 requires restart, a restart process of the monitoring camera 1000 may be performed between the network leaving notification event and the network joining notification event.

Next, processes performed by the monitoring camera 1000 of the present embodiment will be described with reference to FIGS. 11A and 11B. In an embodiment in which a processor is built in the control unit 1001 of the monitoring camera 1000, the process flows of FIG. 11A and FIG. 11B indicate a program for causing the control unit 1001 to execute the procedures illustrated in FIGS. 11A and 11B. The processor built on the control unit 1001 is a computer, and executes a program read out from the storage unit 1002 built in the monitoring camera 1000.

FIG. 11A is a flowchart of a process of when the monitoring camera 1000 has received a GetVSCOptions command from the client 2000.

FIG. 11B is a flowchart of a process of when the monitoring camera 1000 has received the above-described SetVideoSource command from the client 2000. Processes in FIG. 11B that are the same as those in FIG. 6A are denoted with the same reference signs, and description is omitted.

In step S1500 of FIG. 11A, the control unit 1001 refers to the table of FIG. 4 stored in the storage unit 1002, and determines whether the VSM after change is consistent with the currently set VEC. The control unit 1001 moves the process to step S1007 if there is any insistent VEC, and moves the process to step S1502 if there is no inconsistent VEC.

In step S1502, the control unit 1001 transmits the network leaving notification event to the client 2000.

In step S1503, the control unit 1001 refers to set RebootFlag of the VSM, and determines whether the VSM has been changed to the VSM that requires restart. The control unit 1001 executes step S1701 when the restart is required (RebootFlag is True), and moves the process to step S1505 when the restart is not required (RebootFlag is False).

In step S1701, the control unit 1001 performs an actual restart process of the monitoring camera 1000. As described above, when having received a command that causes the image capturing unit 1003 to generate captured data in a predetermined set value, the control unit 1001 controls the restart process after transmitting, to the client 2000, the leaving notification that indicates the monitoring camera 1000 has left the network. Here, in the present embodiment, the command that generates captured data in a predetermined set value is a command that causes the captured data of the image capturing unit 1003 to have predetermined resolution, a predetermined frame rate, or a predetermined coding format.

In step S1505, the control unit 1001 transmits the network joining notification event to the client 2000. When having received the network joining notification event, the client 2000 reacquires the set value set to the monitoring camera 1000. The reacquired set value includes a VEC.

As described above, the monitoring camera 1000 can prompt the client 2000 to reacquire the set value of the monitoring camera 1000 according to an update of the setting of at least one of the resolution, the frame rate, and the coding format of the image data generated by the encoding unit 1004. That is, when having set the set value (for example, the VSM) for generating the captured data according to a received command, the monitoring camera 1000 performs, through the network, notification that indicates the monitoring camera 1000 has connected to the network. The notification is performed regardless of whether a restart process is performed.

FIG. 11B illustrates a process of when the monitoring camera 1000 has received the above-described SetVideoEncoderConfiguration command from the client 2000.

A process from steps S1201 to S1203 is similar to the process described with reference to FIG. 6C in the first embodiment.

In step S1400, the control unit 1001 refers to the table of FIG. 4 stored in the storage unit 1002, and determines whether the coding format, the resolution, and the maximum frame rate set to the received VEC are consistent with the current VSM.

When consistent, the control unit 1001 terminates the command process. As described above, when having received the change command of the VEC and when does not change the setting to the image data generated by the image capturing unit 1003, the control unit 1001 does not perform update notification to the client 2000.

In not consistent, the control unit 1001 moves the process to step S1410. In step S1410, the control unit 1001 refers to the table of FIG. 4 stored in the storage unit 1002, and switches the setting to the VSM consistent with the input VEC.

Next, in step S1502, the control unit 1001 transmits the network leaving notification event to the client 2000 in order to notify the client 2000 on the network of the change of the VSM.

In step S1503, the control unit 1001 refers to the set RebootFlag of the VSM, and determines whether the VSM has been changed to the VSM that requires restart. The control unit 1001 executes step S1701 when the restart is required (RebootFlag is True), and moves the process to step S1505 when the restart is not required (RebootFlag is False).

In step S1701, the control unit 1001 performs an actual restart process of the monitoring camera 1000. As described above, when having received a command that causes the encoding unit 1004 to generate image data in a predetermined set value, the control unit 1001 controls the restart process after transmitting the leaving notification that indicates the monitoring camera 1000 has left the network to the client 2000. Here, in the present embodiment, the command that generates captured data in a predetermined set value is a command that causes the captured data of the image capturing unit 1003 to have predetermined resolution, a predetermined frame rate, or a predetermined coding format.

In step S1505, the control unit 1001 transmits the network joining event to the client 2000 in order to notify the client 2000 on the network of the change of the VEC. As described above, the monitoring camera 1000 notifies the setting of at least one of the resolution, the frame rate, and the coding format of the image data generated by the encoding unit 1004 has been updated by means of reconnection notification that indicates the monitoring camera 1000 has been reconnected to the network after completion of the restart process.

As described above, when having received the network joining notification event (Hello), the client 2000 transmits an acquisition request (GetVideoEncoderConfigurationsOptions) of the set value in order to acquire the set value (VEC) set to the monitoring camera 1000.

FIG. 7 illustrates an example of a setting screen of the client 2000 in which setting of the VSM and the VEC of the monitoring camera 1000 described in the present embodiment is performed.

In the third embodiment, the monitoring camera 1000 updates, when one of the VSM and the VEC has been changed by the client 2000, the other to have consistent content.

As described above, the setting related to the generation of the image data in the image capturing unit 1003 and the setting related to the image data in the encoding unit 1004 can be consistent with each other.

Further, when having updated the other, the monitoring camera 1000 transmits a network leaving notification event and a network rejoining notification event to the client 2000 regardless of whether restart is required for the setting to a new VSM.

Accordingly, the set value to the image capturing unit 1003 of the monitoring camera 1000 and the set value to the encoding unit 1004 can be consistent with each other between the monitoring camera 1000 and the client 2000.

According to the first to third embodiments, the set value to the image capturing unit and the set value to the encoding unit of the monitoring camera can be consistent with each other between the image capturing device and the client.

Other Embodiments

As described above, while the monitoring camera in which the present invention is incorporated, the application program, and the operation of the client has been illustrated in the first to third embodiments, the embodiments are not necessarily limited to the above description, and may be partially changed.

In FIG. 9A of the second embodiment, a case has been described, in which, when having received a command of GetVECOptions, the monitoring camera 1000 provides the client 2000 with the options of the set values of all VECs that can be acquired by the monitoring camera 1000. However, the embodiment is not limited to the description. For example, responses to the GetVECOptions command may be switched before and after the client 2000 first designates the set value after the client 2000 is connected to the monitoring camera 1000.

That is, when the monitoring camera 1000 has received the GetVECOptions command before the client 2000 first designates the set value of the VEC after the client 2000 is connected to the monitoring camera 1000, the monitoring camera 1000 performs the process of S1300 as a response. Meanwhile, when the monitoring camera 1000 has received the GetVECOptions command after the client 2000 once sets the set value of the VEC to the monitoring camera 1000, the monitoring camera 1000 may perform the process of FIG. 6B of the first embodiment as a response.

That is, the monitoring camera 1000 receives a transmission request of candidates of the set value (VEC) that can be set as the resolution, the frame rate, or the coding format of image data generated by the encoding unit 1004. When having received the transmission request before receiving the set value (VSM) of the image capturing unit 1003 from the client 2000, the monitoring camera 1000 notifies the client 2000 of information indicating the candidates of the set value (VEC) that can be set to the encoding unit 1004. Further, when having received the transmission request after receiving the command that sets the set value (VSM) of the image capturing unit 1003 from the client 2000, the monitoring camera 1000 notifies the client 2000 of information indicating the set value consistent with the received command from among the candidates of the set value (VEC) that can be set to the encoding unit 1004.

Thereby, when the client 2000 first performs setting to the monitoring camera 1000, the client 2000 can select and set the VEC from among all set values that can be set to the encoding unit 1004 of the monitoring camera 1000. Further, the VSM consistent with the set VEC is automatically set by the monitoring camera 1000. Once the VEC and the VSM are set to the monitoring camera 1000, the client 2000 can select the set value from among the VECs consistent with the set VSM. As described above, the process of the first embodiment and the process of the second embodiment may be used together.

Further, in step S1410, a case has been described, in which the VSM adaptable to the resolution set to the encoding unit 1004 is set by the SetVideoEncoderConfiguration command. However, the embodiment is not limited to the description. For example, a plurality of VSMs adaptable to the set resolution exists may exist. Therefore, the adaptable VSM may be selected based on not only the resolution, but also a plurality of other settings of the encoding unit such as the encoding format, the maximum frame rate, and the like.

Further, in the step S1301, the coding formats of all possible VECs are acquired as the options. However, the embodiment is not limited to the description. Only the options of the coding formats commonly consistent with all VSMs may be acquired. Thereby, while the range of providing the options is decreased, the coding format that is not consistent with the VSM selected at that time is prevented from being designated by the SetVideoEncoderConfiguration command in step S1201.

In the process of steps S1300 to S1302 of FIG. 9A, all possible VECs are acquired. However, the embodiment is not limited to the description. The options of the set value commonly consistent with the VSMs (for example, in the example of FIG. 4, S1 to S3) that can be set to the monitoring camera 1000 may be acquired. Thereby, while the range of providing the options is decreased, the setting of the VEC inconsistent with the VSM set to the monitoring camera 1000 can be prevented.

In this case, as for the maximum frame rate and the maximum bit rate, the maximum frame rate and the maximum bit rate from among the set values commonly consistent with the VSMs (in the example of FIG. 4, S1 to S3) that can be set to the monitoring camera 1000 can be provided as the set values.

Further, the restart process of the monitoring camera 1000 may be, for example, restart of an execution process related to the processes of the changed VSC and VEC, or restart of an operation system of the monitoring camera 1000.

A case has been described with reference to FIG. 5C, in which both of the VSM change notification event 7402 and the VEC change notification event 7403 are transmitted following the network leaving event/joining notification event 7401. However, the embodiment is not limited to the description. After the notification of both of the VSM change notification event 7402 and the VEC change notification event 7403, the network leaving event/joining notification event 7401 may be performed.

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. An image capturing system comprising:
   an image capturing apparatus configured to transmit image data to an image receiving apparatus; and
   the image receiving apparatus configured to receive the image data from the image capturing apparatus,
   wherein the image capturing apparatus comprises:
   an image capturing unit configured to generate the image data;
   a communication unit configured to receive a command for changing Video Source Mode to define at least a frame rate and resolution related to the image data, from an external apparatus via a network; and
   a control unit configured to perform a reboot process and cause the communication unit to transmit a predetermined notification to the external apparatus, in a case where Video Source Mode being set in the image capturing apparatus is changed from first Video Source Mode to second Video Source Mode different from the first Video Source Mode, in response to the command for changing Video Source Mode received by the communication unit,
   wherein the control unit is configured to perform control not to perform the reboot process in a case where Video Source Mode being set in the image capturing apparatus is changed from the first Video Source Mode to third Video Source Mode different from the first Video Source Mode and the second Video Source Mode in response to the command for changing Video Source Mode received by the communication unit,
   wherein the control unit is configured to cause the communication unit to transmit, to the external apparatus, information indicating that the second Video Source Mode is a target on which the reboot process is to be performed and information indicating that the third Video Source Mode is not a target on which the reboot process is to be performed, in response to a request command from the external apparatus, and
   wherein the image receiving apparatus comprises a display control unit configured to cause a display unit to display a setting screen for designating at least one of the frame rate and the resolution.

2. The image capturing system according to claim 1, wherein the Video Source Mode is information to define a maximum value of the frame rate.

3. The image capturing system according to claim 1, wherein the Video Source Mode is information to define a maximum value of the resolution.

4. The image capturing system according to claim 1, wherein the Video Source Mode is information to further define a usable encoding method.

5. The image capturing system according to claim 1, wherein the Video Source Mode is information to define an option of the resolution.

6. The image capturing system according to claim 1, wherein the Video Source Mode is information to define a settable range of the frame rate.

7. The image capturing system according to claim 1, wherein the Video Source Mode is information to define a parameter in Video Encoder Configuration.

8. The image capturing system according to claim 1, wherein the Video Source Mode is information to define a parameter in Video Source Configuration.

9. The image capturing system according to claim 1, wherein the Video Source Mode is information to indicate a combination of a parameter in Video Source Configuration and a parameter in Video Encoder Configuration.

10. The image capturing system according to claim 1, wherein the communication unit is configured to transmit a network leaving notification in a case where the control unit performs the reboot process.

11. The image capturing system according to claim 1, wherein Video Encoder Configuration is to be changed in a case where the Video Source Mode is changed and a parameter in Video Source Mode to which the Video Source Mode has been changed is inconsistent with a parameter in the Video Encoder Configuration.

12. The image capturing system according to claim 1, wherein the command for changing Video Source Mode is Set Video Source Mode.

13. The image capturing system according to claim 1, wherein the control unit is configured to cause the communication unit to be reconnected to the network after causing the communication unit to leave the network, as the reboot process.

14. The image capturing system according to claim 1, wherein the predetermined notification is a notification to indicate that the image capturing apparatus has connected to the network.

15. The image capturing system according to claim 1, wherein the predetermined notification is a notification in response to change of the Video Source Mode.

16. The image capturing system according to claim 1, wherein the control unit is configured to cause the communication unit to stop transmitting the image data in response to reception of the command.

17. The image capturing system according to claim 1, wherein the control unit is configured to perform the reboot process in a case where a set value set in the image capturing apparatus is changed to a predetermined set value.

18. The image capturing system according to claim 17, wherein the predetermined set value is predetermined resolution.

19. The image capturing system according to claim 17, wherein the predetermined set value is a predetermined frame rate.

20. The image capturing system according to claim 17,
   wherein the Video Source Mode is information to further define a usable encoding method, and
   wherein the predetermined set value is a predetermined encoding method.

21. The image capturing system according to claim 10, wherein the network leaving notification is Bye.

22. The image capturing system according to claim 14, wherein the notification to indicate that the image capturing apparatus has connected to the network is Hello.

23. The image capturing system according to claim 1, wherein the external apparatus is the image receiving apparatus.

24. The image capturing system according to claim 1, wherein the setting screen is for designating the resolution.

25. The image capturing system according to claim 24, wherein the resolution is capable of being designated by a button on the setting screen.

26. The image capturing system according to claim 1, wherein the setting screen is for designating the frame rate.

27. The image capturing system according to claim 26, wherein the frame rate is capable of being designated by a scroll bar on the setting screen.

28. The image capturing system according to claim 4, wherein the setting screen is for further designating encoding method.

29. The image capturing system according to claim 28, wherein the encoding method is capable of being designated from a dropdown list on the setting screen.

30. The image capturing system according to claim 1, wherein the image capturing apparatus is configured to transmit the image data encoded by an encoding unit.

31. An image transmission method comprising:
transmitting image data to an image receiving apparatus from an image capturing apparatus that generates the image data;
receiving the image data from the image capturing apparatus by the image receiving apparatus;
receiving a command from an external apparatus via a network by the image receiving apparatus, the command being for changing Video Source Mode to define at least a frame rate and resolution related to the image data; and
performing a reboot process and transmitting a predetermined notification to the external apparatus from the image capturing apparatus, in a case where Video Source Mode being set in the image capturing apparatus is changed from first Video Source Mode to second Video Source Mode different from the first Video Source Mode, in response to the command for changing Video Source Mode received,
wherein the reboot process is not performed in a case where Video Source Mode being set in the image capturing apparatus is changed from the first Video Source Mode to third Video Source Mode different from the first Video Source Mode and the second Video Source Mode in response to the command for changing Video Source Mode received,
wherein information indicating that the second Video Source Mode is a target on which the reboot process is to be performed and information indicating that the third Video Source Mode is not a target on which the reboot process is to be performed is transmitted to the external apparatus from the image capturing apparatus, in response to a request command from the external apparatus, and
wherein the image receiving apparatus displays a setting screen for designating at least one of the frame rate and the resolution.

32. A non-transitory computer-readable storage medium which stores a program for executing an image transmission method, the method comprising:
transmitting image data to an image receiving apparatus from an image capturing apparatus that generates the image data;
receiving the image data from the image capturing apparatus by the image receiving apparatus;
receiving a command from an external apparatus via a network by the image receiving apparatus, the command being for changing Video Source Mode to define at least a frame rate and resolution related to the image data; and
performing a reboot process and transmitting a predetermined notification to the external apparatus from the image capturing apparatus, in a case where Video Source Mode being set in the image capturing apparatus is changed from first Video Source Mode to second Video Source Mode different from the first Video Source Mode, in response to the command for changing Video Source Mode received,
wherein the reboot process is not performed in a case where Video Source Mode being set in the image capturing apparatus is changed from the first Video Source Mode to third Video Source Mode different from the first Video Source Mode and the second Video Source Mode in response to the command for changing Video Source Mode received,
wherein information indicating that the second Video Source Mode is a target on which the reboot process is to be performed and information indicating that the third Video Source Mode is not a target on which the reboot process is to be performed is transmitted to the external apparatus from the image capturing apparatus, in response to a request command from the external apparatus, and
wherein the image receiving apparatus displays a setting screen for designating at least one of the frame rate and the resolution.

33. The image transmission method according to claim 31, wherein the Video Source Mode is information to further define a usable encoding method.

34. The image transmission method according to claim 31, wherein the Video Source Mode is information to define a parameter in Video Encoder Configuration.

35. The image transmission method according to claim 31, wherein the Video Source Mode is information to define a parameter in Video Source Configuration.

36. The image transmission method according to claim 31, wherein the Video Source Mode is information to indicate a combination of a parameter in Video Source Configuration and a parameter in Video Encoder Configuration.

37. The image transmission method according to claim 31, wherein a network leaving notification is transmitted from the image capturing apparatus in a case where the reboot process is performed.

38. The image transmission method according to claim 31, wherein the command for changing Video Source Mode is Set Video Source Mode.

39. The image transmission method according to claim 31, wherein the image capturing apparatus is reconnected to the network after the image capturing apparatus left the network, as the reboot process.

40. The image transmission method according to claim 31, wherein the predetermined notification is a notification to indicate that the image capturing apparatus has connected to the network.

41. The image transmission method according to claim 31, wherein the reboot process is performed in a case where a set value set in the image capturing apparatus is changed to a predetermined set value.

42. The image transmission method according to claim 41, wherein the predetermined set value is a predetermined frame rate.

43. The image transmission method according to claim 37, wherein the network leaving notification is Bye.

44. The image transmission method according to claim 40, wherein the notification to indicate that the image capturing apparatus has connected to the network is Hello.

45. The image transmission method according to claim 31, wherein the external apparatus is the image receiving apparatus.

46. The image transmission method according to claim 31, wherein the setting screen is for designating the resolution.

47. The image transmission method according to claim 46, wherein the resolution is capable of being designated by a button on the setting screen.

48. The image transmission method according to claim 31, wherein the setting screen is for designating the frame rate.

49. The image transmission method according to claim 48, wherein the frame rate is capable of being designated by a scroll bar on the setting screen.

50. The image transmission method according to claim 33, wherein the setting screen is for further designating encoding method.

51. The image transmission method according to claim 50, wherein the encoding method is capable of being designated from a dropdown list on the setting screen.

52. An image capturing system comprising:
an image capturing apparatus configured to transmit image data to an image receiving apparatus; and
the image receiving apparatus configured to receive the image data from the image capturing apparatus,
wherein the image capturing apparatus comprises a computer executing instructions that, when executed by the computer, cause the computer to function as:
an image capturing unit configured to generate the image data; and
a control unit configured to control a communication unit which receives a command for changing Video Source Mode to define at least a frame rate and resolution related to the image data, from an external apparatus via a network,
wherein the control unit is configured to perform a reboot process and cause the communication unit to transmit a predetermined notification to the external apparatus, in a case where Video Source Mode being set in the image capturing apparatus is changed from first Video Source Mode to second Video Source Mode different from the first Video Source Mode, in response to the command for changing Video Source Mode received by the communication unit,
wherein the control unit is configured to perform control not to perform the reboot process in a case where Video Source Mode being set in the image capturing apparatus is changed from the first Video Source Mode to third Video Source Mode different from the first Video Source Mode and the second Video Source Mode, in response to the command for changing Video Source Mode received by the communication unit,
wherein the control unit is configured to cause the communication unit to transmit, to the external apparatus, information indicating that the second Video Source Mode is a target on which the reboot process is to be performed and information indicating that the third Video Source Mode is not a target on which the reboot process is to be performed, in response to a request command from the external apparatus,
wherein the image receiving apparatus comprises a computer executing instructions that, when executed by the computer, cause the computer to function as a display control unit, and
wherein the display control unit is configured to cause a display unit to display a setting screen for designating at least one of the frame rate and the resolution.

53. The image capturing system according to claim 52, wherein the Video Source Mode is information to further define a usable encoding method.

54. The image capturing system according to claim 52, wherein the Video Source Mode is information to define a parameter in Video Encoder Configuration.

55. The image capturing system according to claim 52, wherein the Video Source Mode is information to define a parameter in Video Source Configuation.

56. The image capturing system according to claim 52, wherein the Video Source Mode is information to indicate a combination of a parameter in Video Source Configuration and a parameter in Video Encoder Configuration.

57. The image capturing system according to claim 52, wherein the communication unit is configured to transmit a network leaving notification in a case where the control unit performs the reboot process.

58. The image capturing system according to claim 52, wherein the command for changing Video Source Mode is Set Video Source Mode.

59. The image capturing system according to claim 52, wherein the control unit is configured to cause the communication unit to be reconnected to the network after causing the communication unit to leave the network, as the reboot process.

60. The image capturing system according to claim 52, wherein the predetermined notification is a notification to indicate that the image capturing apparatus has connected to the network.

61. The image capturing system according to claim 52, wherein the control unit is configured to perform the reboot process in a case where a set value set in the image capturing apparatus is changed to a predetermined set value.

62. The image capturing system according to claim 61, wherein the predetermined set value is a predetermined frame rate.

63. The image capturing system according to claim 57, wherein the network leaving notification is Bye.

64. The image capturing system according to claim 60, wherein the notification to indicate that the image capturing apparatus has connected to the network is Hello.

65. The image capturing system according to claim 52, wherein the external apparatus is the image receiving apparatus.

66. The image capturing system according to claim 52, wherein the setting screen is for designating the resolution.

67. The image capturing system according to claim 66, wherein the resolution is capable of being designated by a button on the setting screen.

68. The image capturing system according to claim 52, wherein the setting screen is for designating the frame rate.

69. The image capturing system according to claim 68, wherein the frame rate is capable of being designated by a scroll bar on the setting screen.

70. The image capturing system according to claim 53, wherein the setting screen is for further designating encoding method.

71. The image capturing system according to claim 70, wherein the encoding method is capable of being designated from a dropdown list on the setting screen.

* * * * *